United States Patent
Ogura et al.

(10) Patent No.: US 8,128,747 B2
(45) Date of Patent: Mar. 6, 2012

(54) WATER-BASED INK FOR INK-JET RECORDING, INK CARTRIDGE AND INK-JET RECORDING APPARATUS

(75) Inventors: Tomoyo Ogura, Yokohama (JP); Michiko Aoyama, Nagoya (JP); Narumi Koga, Nagoya (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 281 days.

(21) Appl. No.: 12/342,835

(22) Filed: Dec. 23, 2008

(65) Prior Publication Data

US 2009/0165672 A1   Jul. 2, 2009

(30) Foreign Application Priority Data

| Dec. 28, 2007 | (JP) | 2007-338534 |
| Dec. 28, 2007 | (JP) | 2007-338535 |
| Sep. 24, 2008 | (JP) | 2008-244703 |
| Oct. 23, 2008 | (JP) | 2008-272884 |

(51) Int. Cl.
   *C09D 11/02* (2006.01)

(52) U.S. Cl. ............... 106/31.48; 106/31.58

(58) Field of Classification Search ........... 106/31.48, 106/31.58; 347/100
   See application file for complete search history.

(56) References Cited

U.S. PATENT DOCUMENTS

| 5,476,541 | A | 12/1995 | Tochihara |
| 5,560,771 | A | 10/1996 | Takemoto et al. |
| 6,712,462 | B2 | 3/2004 | Ito et al. |
| 7,241,332 | B2 | 7/2007 | Yoshizawa et al. |
| 7,297,199 | B2 | 11/2007 | Osumi et al. |
| 7,465,347 | B2 * | 12/2008 | Kitamura et al. ......... 106/31.48 |

(Continued)

FOREIGN PATENT DOCUMENTS

JP    06-100809    4/1994

(Continued)

OTHER PUBLICATIONS

Notification of Reasons for Rejection for Japanese Patent Application No. JP 2008-244703 mailed Nov. 12, 2010.

(Continued)

*Primary Examiner* — Helene Klemanski
(74) *Attorney, Agent, or Firm* — Banner & Witcoff, Ltd.

(57) ABSTRACT

A water-based ink for ink-jet recording includes a coloring agent, water, and a water-soluble organic solvent. The coloring agent includes the following dye (1) and dye (2). The water-based ink is good in clearness, color development, and preservation stability as well as good in toughness of a recording material recorded using the water-based ink.

Dye (1): dye represented by the following general formula (1)

Dye (2): at least one dye selected from the group consisting of C. I. Direct Yellow 86, C. I. Direct Yellow 132, C. I. Direct Yellow 142, and C. I. Direct Yellow 173.

(1)

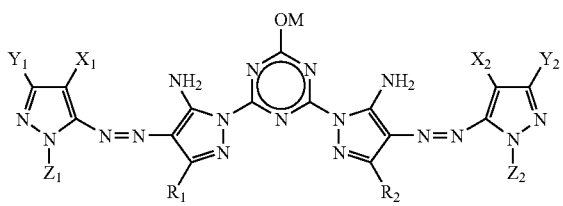

22 Claims, 1 Drawing Sheet

U.S. PATENT DOCUMENTS

| | | | |
|---|---|---|---|
| 7,553,358 B2 * | 6/2009 | Okamura et al. | 106/31.48 |
| 7,731,788 B2 * | 6/2010 | Kitamura et al. | 106/31.48 |
| 7,736,427 B2 * | 6/2010 | Kitamura et al. | 106/31.48 |
| 7,740,695 B2 | 6/2010 | Kitamura et al. | |
| 2006/0016368 A1 | 1/2006 | Ozawa et al. | |
| 2008/0145561 A1 * | 6/2008 | Kitamura et al. | 106/31.48 |
| 2008/0145562 A1 * | 6/2008 | Kitamura et al. | 106/31.48 |
| 2008/0151028 A1 | 6/2008 | Yamakami et al. | |
| 2008/0257209 A1 * | 10/2008 | Kitamura et al. | 106/31.48 |
| 2008/0274283 A1 * | 11/2008 | Tateishi et al. | 427/256 |
| 2008/0274285 A1 * | 11/2008 | Okamura et al. | 106/31.48 |
| 2009/0000511 A1 | 1/2009 | Kitamura et al. | |
| 2009/0167830 A1 * | 7/2009 | Iwamura | 106/31.48 |

FOREIGN PATENT DOCUMENTS

| | | |
|---|---|---|
| JP | 06-228482 | 8/1994 |
| JP | 2000-154344 | 6/2000 |
| JP | 2002-338853 | 11/2002 |
| JP | 2002-338854 | 11/2002 |
| JP | 2004-323587 | 11/2004 |
| JP | 2006-063329 | 3/2006 |
| JP | 2006-096995 | 4/2006 |
| JP | 2007-063520 | 3/2007 |
| JP | 2007-138124 | 6/2007 |
| JP | 2007-191590 | 8/2007 |
| JP | 2007-191635 A | 8/2007 |
| JP | 2007-191652 A | 8/2007 |
| JP | 2007-191653 A | 8/2007 |
| JP | 2007-197475 A | 8/2007 |
| JP | 2008-031261 A | 2/2008 |
| JP | 2008-081693 A | 4/2008 |
| JP | 2008-081697 A | 4/2008 |
| JP | 2008-150434 A | 7/2008 |
| JP | 2008-173965 A | 7/2008 |
| JP | 2008-297541 A | 12/2008 |
| JP | 2009-155605 A | 7/2009 |
| WO | WO 2006/082669 A1 * | 8/2006 |

OTHER PUBLICATIONS

Notification of Reasons for Rejection for Japanese Patent Application No. JP 2008-272884 mailed Nov. 12, 2010.

* cited by examiner

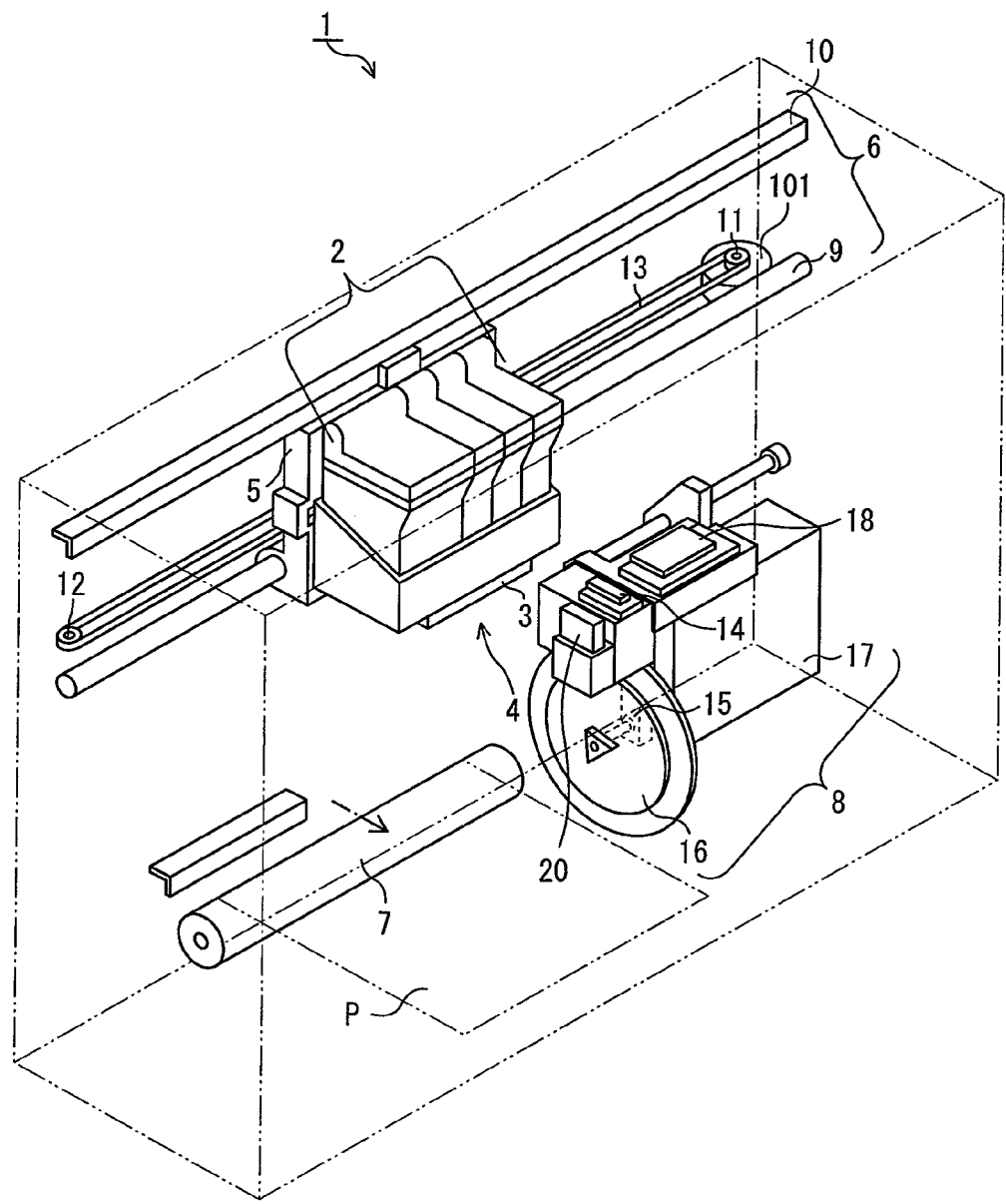

WATER-BASED INK FOR INK-JET RECORDING, INK CARTRIDGE AND INK-JET RECORDING APPARATUS

CROSS-REFERENCE TO RELATED APPLICATION

This application claims priority from Japanese Patent Application Nos. 2007-338534, and 2007-338535 filed on Dec. 28, 2007, 2008-244703 filed on Sep. 24, 2008, and 2008-272884 filed on Oct. 23, 2008.

The entire subject matter of the Japanese Patent Applications is incorporated herein by reference.

BACKGROUND

Conventionally, as a yellow ink for ink-jet recording, an ink is known that contains C. I. Direct Yellow 86, C. I. Direct Yellow 132, C.I. Direct Yellow 142, or C.I. Direct Yellow 173. The ink is required to be (i) good in clearness and color development (ii) not deteriorated in prolonged storage and good in preservation stability, and (iii) good in toughness such as light resistance and ozone resistance of a recording material. However, there were no conventional inks that satisfy all of the aforementioned performances.

SUMMARY

A water-based ink for ink-jet recording comprises a coloring agent, water, and a water-soluble organic solvent. The coloring agent comprises the following dye (1) and dye (2).

Dye (1): dye represented by the following general formula (1)

Dye (2): at least one dye selected from the group consisting of C. I. Direct Yellow 86, C. I. Direct Yellow 132, C. I. Direct Yellow 142, and C. I. Direct Yellow 173.

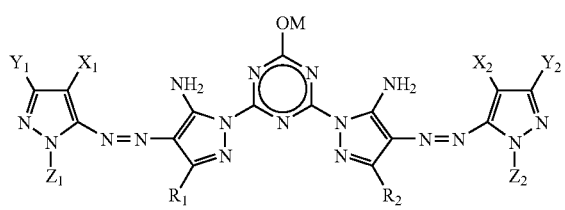

(1)

wherein in the general formula (1), $R_1$, $R_2$, $Y_1$, and $Y_2$ each represents a monovalent group, provided that $R_1$, $R_2$, $Y_1$, and $Y_2$ may be the same or different;

$X_1$ and $X_2$, each independently, represents an electron attractive group, provided that $X_1$ and $X_2$ may be the same or different;

$Z_1$ and $Z_2$, each independently, represents a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, provided that $Z_1$ and $Z_2$ may be the same or different; and M represents a hydrogen atom, or a cation.

An ink cartridge comprises the water-based ink for ink-jet recording.

An ink-jet recording apparatus comprises the ink cartridge and an ink ejection unit. The water-based ink for ink-jet recording comprised in the ink cartridge is ejected from the ink ejection unit.

BRIEF DESCRIPTION OF THE DRAWINGS

FIG. 1 is a schematic perspective view showing a construction of an example of an ink-jet recording apparatus.

DETAILED DESCRIPTION

With respect to the water-based ink for ink-jet recording, a weight ratio between the dye (1) and the dye (2) in the ink may be in the range of about 6:4 to about 9:1.

With respect to the water-base ink for ink-jet recording, a total amount of the dye (1) and the dye (2) relative to the total amount of the ink may be in the range of about 0.1 wt % to about 7 wt %.

With respect to the water-based ink for ink-jet recording, the water-soluble organic solvent may comprise polyalcohol.

With respect to the water-based ink for ink-jet recording, the polyalcohol may be glycerin.

With respect to the water-based ink for ink-jet recording, an amount of the glycerin relative to the total amount of the ink may be in the range of about 5 wt % to about 40 wt %.

Application of the water-based ink for ink-jet recording is not particularly limited and, for example, may be used as a water-based yellow ink.

Next, the water-based ink for ink-jet recording (hereinafter, also may be referred to as "water-based ink" or "ink") is explained. The water-based ink for ink-jet recording comprises a coloring agent, water, and a water-soluble organic solvent. As described above, the coloring agent comprises the dye (1) and the dye (2).

As described above, the dye (1) is a dye represented by the general formula (1).

In the general formula (1), $R_1$, $R_2$, $Y_1$, and $Y_2$ each represents a monovalent group, provided that $R_1$, $R_2$, $Y_1$, and $Y_2$ may be the same or different. The monovalent group is a hydrogen atom, or a monovalent substituent. Examples of the monovalent substituent include a halogen atom, an alkyl group, a cycloalkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxy carbonyloxy group, an aryloxy carbonyloxy group, an amino group, an amido group, an acylamino group, an ureido group, an amino carbonyl amino group, an alkoxy carbonyl amino group, an aryloxy carbonyl amino group, a sulfamoyl amino group, an alkyl sulfonyl amino group, an aryl sulfonyl amino group, an alkyl thio group, an aryl thio group, a heterocyclic thio group, a sulfamoyl group, an alkyl sulfinyl group, an aryl sulfinyl group, an alkyl sulfonyl group, an aryl sulfonyl group, an acyl group, an aryloxy carbonyl group, an alkoxy carbonyl group, a carbamoyl group, a phosphino group, a phosphinyl group, a phosphinyloxy group, a phosphinyl amino group, a silyl group, an azo group, an imido group and the like. Each may further have a monovalent substituent. Out of these, particularly preferred is a hydrogen atom, a halogen atom, an alkyl group, an aryl group, a heterocyclic group, a cyano group, an alkoxy group, an amido group, an ureido group, an alkyl sulfonyl amino group, an aryl sulfonyl amino group, a sulfamoyl group, an alkyl sulfonyl group, an aryl sulfonyl group, a carbamoyl group, or an alkoxy carbonyl group. Particularly, a hydrogen atom, an alkyl group, an aryl group, a cyano group, or an alkyl sulfonyl group is preferred.

The halogen atom is a chlorine atom, a bromine atom, or an iodine atom. Out of these, a chlorine atom, or a bromine atom is preferred.

The alkyl group includes a substituted or unsubstituted alkyl group. The substituted or unsubstituted alkyl group may be an alkyl group having 1 to 30 carbon atoms. Examples of the alkyl group include a methyl group, an ethyl group, a butyl group, a t-butyl group, an n-octyl group, an eicosyl group, a 2-chloroethyl group, a hydroxyethyl group, a cyano ethyl group, a 4-sulfobutyl group and the like. As the examples of the substituent of the substituted alkyl group include a straight chain or branched alkyl group having 1 to 12 carbon atoms such as a methyl group, an ethyl group, a propyl group, an isopropyl group, a sec-butyl group, a t-butyl group, a 2-ethylhexyl group, a 2-methyl sulfonyl ethyl group, a 3-phenoxypropyl group, a trifluoromethyl group and the like; a straight chain or branched aralkyl group having 7 to 18 carbon atoms; a straight chain or branched alkenyl group having 2 to 12 carbon atoms; a straight chain or branched alkynyl group having 2 to 12 carbon atoms; a straight chain or branched cycloalkyl group having 3 to 12 carbon atoms such as a cyclopentyl group and the like; a straight-chain or branched cycloalkenyl group having 3 to 12 carbon atoms; a halogen atom such as a chlorine atom, a bromine atom and the like; an aryl group such as a phenyl group, a 4-t-butylphenyl group, a 2,4-di-t-amyl phenyl group and the like; a heterocyclic group such as an imidazolyl group, a pyrazolyl group, a thoriazolyl group, a 2-furyl group, a 2-thienyl group, a 2-pyrimidinyl group, a 2-benzothiazolyl group and the like; a cyano group; a hydroxyl group; a nitro group; a carboxy group; an amino group; an alkoxy group such as a methoxy group, an ethoxy group, a 2-methoxyethoxy group, a 2-methyl sulfonyl ethoxy group and the like; an aryloxy group such as a phenoxy group, a 2-methyl phenoxy group, a 4-t-butyl phenoxy group, a 3-nitro phenoxy group, a 3-t-butyloxy carbonyl phenoxy group, a 3-methoxy carbonylphenyloxy group and the like; an acylamino group such as an acetamide group, a benzamide group, a 4-(3-t-butyl-4-hydroxy phenoxy)butane amide group and the like; an alkylamino group such as a methylamino group, a butylamino group, a diethylamino group, a methyl butylamino group and the like; an amino group such as a phenyl amino group, a 2-chloroanilino group and the like; an ureido group such as a phenylureido group, a methylureido group, an N,N-dibutylureido group and the like; a sulfamoyl amino group such as an N,N-dipropyl sulfamoyl amino group and the like; an alkyl thio group such as a methyl thio group, an octyl thio group, a 2-phenoxyethyl thio group and the like; an aryl thio group such as a phenyl thio group, a 2-butoxy-5-t-octylphenyl thio group, a 2-carboxy phenyl thio group and the like; an alkyloxy carbonyl amino group such as a methoxy carbonyl amino group and the like; an alkyl sulfonyl amino group such as a methyl sulfonyl amino group and the like; an aryl sulfonyl amino group such as a phenyl sulfonyl amino group, a p-toluene sulfonyl amino group and the like; a carbamoyl group such as an N-ethyl carbamoyl group, an N,N-dibutyl carbamoyl group and the like; a sulfamoyl group such as an N-ethyl sulfamoyl group, an N,N-dipropyl sulfamoyl group, an N-phenyl sulfamoyl group and the like; a sulfonyl group such as a methyl sulfonyl group, an octyl sulfonyl group, a phenyl sulfonyl group, a p-toluene sulfonyl group and the like; an alkyloxy carbonyl group such as a methoxy carbonyl group, a butyloxy carbonyl group and the like; a heterocyclic oxy group such as a 1-phenyltetrazol-5-oxy group, a 2-tetrahydropyranyloxy group and the like; an azo group such as a phenylazo group, a 4-methoxyphenyl azo group, a 4-pivaloylamino phenylazo group, a 2-hydroxy-4-propanoyl phenylazo group and the like; an acyloxy group such as an acetoxy group and the like; a carbamoyloxy group such as an N-methyl carbamoyloxy group, an N-phenylcarbamoyloxy group and the like; a silyloxy group such as a trimethyl silyloxy group, a dibutyl methyl silyloxy group and the like; an aryloxy carbonyl amino group such as a phenoxy carbonyl amino group and the like; an imido group such as an N-succinimido group, an N-phthalimido group and the like; a heterocyclic thio group such as a 2-benzothiazolyl thio group, a 2,4-di-phenoxy-1,3,5-triazole-6-thio group, a 2-pyridylthio group and the like; a sulfinyl group such as a 3-phenoxypropyl sulfinyl group and the like; a phosphonyl group such as a phenoxy phosphonyl group, an octyloxy phosphonyl group, a phenyl phosphonyl group and the like; an aryloxy carbonyl group such as a phenoxy carbonyl group and the like; an acyl group such as an acetyl group, a 3-phenyl propanoyl group, a benzoyl group and the like; and ionic hydrophilic groups such as a carboxyl group, a sulfo group, phosphono group, a quaternary ammonium group and the like. With respect to the alkyl group, the aralkyl group, the alkenyl group, the alkynyl group, the cycloalkyl group, and the cycloalkenyl group, which are the substituent of the substituted alkyl group, those having branched chains are preferable because they improve the solubility of the dye and the stability of the ink; and those having asymmetric carbons are particularly preferred. Out of these, a hydroxy group, an alkoxy group, a cyano group, a halogen atom, a sulfo group (which may also be in the form of a salt) or a carboxyl group (which may also be in the form of a salt) is preferred.

The cycloalkyl groups include a substituted or unsubstituted cycloalkyl group. The substituted or unsubstituted cycloalkyl group may be a cycloalkyl group having 5 to 30 carbon atoms. Examples of the substituent of the substituted cycloalkyl group include the substituents described for the substituted alkyl group. Examples of the cycloalkyl group include a cyclohexyl group, a cyclopentyl group, a 4-n-dodecyl cyclohexyl group and the like.

The aralkyl groups include a substituted or unsubstituted aralkyl group. The substituted or unsubstituted aralkyl group may be an aralkyl group having 7 to 30 carbon atoms. Examples of the substituent of the substituted aralkyl group include the substituents described for the substituted alkyl group. Examples of the aralkyl group include a benzyl group, a 2-phenethyl group and the like.

The alkenyl groups include a straight-chain, branched, or cyclic substituted or unsubstituted alkenyl group. A substituted or unsubstituted alkenyl group may have 2 to 30 carbon atoms. Examples of the substituent of the substituted alkenyl group include the substituents described for the substituted alkyl group. Examples of the alkenyl group include a vinyl group, an allyl group, a prenyl group, a geranyl group, an oleyl group, a 2-cyclopenten-1-yl group, a 2-cyclohexen-1-yl group and the like.

The alkynyl groups are a substituted or unsubstituted alkynyl group having 2 to 30 carbon atoms. Examples of the substituent of the substituted alkynyl group include the substituents described for the substituted alkyl group. Examples of the alkynyl group include an ethynyl group, a propargyl group and the like.

The aryl groups are a substituted or unsubstituted aryl group having 6 to 30 carbon atoms. Examples of the aryl group include a phenyl group, a p-tolyl group, a naphthyl group, an m-chlorophenyl group, an o-hexadecanoyl aminophenyl group and the like. Examples of the substituent of the substituted aryl group include the substituents described for the substituted alkyl group.

The heterocyclic groups are a monovalent group obtained by removing one hydrogen atoms from a 5- or 6-membered substituted or unsubstituted, aromatic or nonaromatic heterocyclic compound, which may also be further condensed. A 5- or 6-membered aromatic heterocyclic group may have 3 to 30 carbon atoms. Examples of the substituent of the substituted heterocyclic group include the substituents described for the substituted alkyl group. Examples of the heterocyclic group include, with no limitation on substitution site, a pyridine group, a pyrazine group, a pyridazine group, a pyrimidine group, a triazine group, a quinoline group, an isoquinoline group, a quinazoline group, a cinnoline group, a phthalazine group, a quinoxaline group, a pyrrole group, an indole group, a furan group, a benzofuran group, a thiophene group, a benzothiophene group, a pyrazole group, an imidazole group, a benzimidazole group, a triazole group, an oxazole group, a benzoxazole group, a thiazole group, a benzothiazole group, an isothiazole group, a benzisothiazole group, a thiadiazole group, an isoxazole group, a benzisoxazole group, a pyrrolidine group, a piperidine group, a piperazine group, an imidazolidine group, a thiazoline group and the like.

The alkoxy groups include a substituted or unsubstituted alkoxy group. The substituted or unsubstituted alkoxy group may be an alkoxy group having 1 to 30 carbon atoms. Examples of the substituent of the substituted alkoxy group include the substituents described for the substituted alkyl group. Examples of the alkoxy group include a methoxy group, an ethoxy group, an isopropoxy group, an n-octyloxy group, a methoxyethoxy group, a hydroxyethoxy group, a 3-carboxy propoxy group and the like.

The aryloxy groups may be a substituted or unsubstituted aryloxy group having 6 to 30 carbon atoms. Examples of the substituent of the substituted aryloxy group include the substituents described for the substituted alkyl group. Examples of the aryloxy group include a phenoxy group, a 2-methyl phenoxy group, a 4-t-butyl phenoxy group, a 3-nitro phenoxy group, a 2-tetradecanoyl amino phenoxy group and the like.

The silyloxy groups may be a silyloxy group having 3 to 20 carbon atoms. Examples of the silyloxy group include a trimethyl silyloxy group, a t-butyldimethyl silyloxy group and the like.

The heterocyclic oxy groups may be a substituted or unsubstituted heterocyclic oxy group having 2 to 30 carbon atoms. Examples of the substituent of the substituted heterocyclic oxy group include the substituents described for the substituted alkyl group. Examples of the heterocyclic oxy group include a 1-phenyltetrazol-5-oxy group, a 2-tetrahydropyranyloxy group and the like.

The acyloxy groups may be a formyloxy group, a substituted or unsubstituted alkyl carbonyloxy group having 2 to 30 carbon atoms, or a substituted or unsubstituted aryl carbonyloxy group having 6 to 30 carbon atoms. Examples of the substituent of the substituted alkyl carbonyloxy group or the substituted aryl carbonyloxy group include substituents described for the substituted alkyl group. Examples of the acyloxy group include a formyloxy group, an acetyloxy group, a pivaloyloxy group, a stearoyloxy group, a benzoyloxy group, a p-methoxyphenyl carbonyloxy group and the like.

The carbamoyloxy groups may be a substituted or unsubstituted carbamoyloxy group having 1 to 30 carbon atoms. Examples of the substituent of the substituted carbamoyloxy group include the substituents described for the substituted alkyl group. Examples of the carbamoyloxy group include an N,N-dimethyl carbamoyloxy group, an N,N-diethyl carbamoyloxy group, a morpholino carbonyloxy group, an N,N-di-n-octyl amino carbonyloxy group, an N-n-octyl carbamoyloxy group and the like.

The alkoxy carbonyloxy groups may be a substituted or unsubstituted alkoxy carbonyloxy group having 2 to 30 carbon atoms. Examples of the substituent of the substituted alkoxy carbonyloxy group include the substituents described for the substituted alkyl group. Examples of the alkoxy carbonyloxy group include a methoxy carbonyloxy group, an ethoxy carbonyloxy group, a t-butoxy carbonyloxy group, an n-octyl carbonyloxy group and the like.

The aryloxy carbonyloxy groups may be a substituted or unsubstituted aryloxy carbonyloxy group having 7 to 30 carbon atoms. Examples of the substituent of the substituted aryloxy carbonyloxy group include the substituents described for the substituted alkyl group. Examples of the aryloxy carbonyloxy group include a phenoxy carbonyloxy group, a p-methoxyphenoxy carbonyloxy group, a p-n-hexadecyloxy phenoxy carbonyloxy group and the like.

The amino groups may be a substituted or unsubstituted alkylamino group having 1 to 30 carbon atoms, a substituted or unsubstituted arylamino group having 6 to 30 carbon atoms. Examples of the substituent of the substituted alkylamino group and the substituted arylamino group include the substituents described for the substituted alkyl group. Examples of the amino group include an amino group, a methylamino group, a dimethylamino group, an aniline group, an N-methyl-anilino group, a diphenyl amino group, a hydroxyethylamino group, a carboxyethylamino group, a sulfoethylamino group, a 3,5-dicarboxy aniline group and the like.

The acylamino groups may be a formyl amino group, a substituted or unsubstituted alkyl carbonyl amino group having 1 to 30 carbon atoms, or a substituted or unsubstituted aryl carbonyl amino group having 6 to 30 carbon atoms. Examples of the substituent of the substituted alkyl carbonyl amino group and the substituted aryl carbonyl amino group include the substituents described for the substituted alkyl group. Examples of the acylamino group include a formylamino group, an acetylamino group, a pivaloylamino group, a lauroylamino group, a benzoylamino group, a 3,4,5-tri-n-octyloxyphenyl carbonyl amino group and the like.

The amino carbonyl amino groups may be a substituted or unsubstituted amino carbonyl amino group having 1 to 30 carbon atoms. Examples of the substituent of the substituted amino carbonyl amino group include the substituents described for the substituted alkyl group. Examples of the amino carbonyl amino group include a carbamoylamino group, an N,N-dimethylamino carbonyl amino group, an N,N-diethylamino carbonyl amino group, a morpholino carbonyl amino group and the like.

The alkoxy carbonyl amino groups may be a substituted or unsubstituted alkoxy carbonyl amino group having 2 to 30 carbon atoms. Examples of the substituent of the substituted alkoxy carbonyl amino group include the substituents described for the substituted alkyl group. Examples of the alkoxy carbonyl amino group include a methoxy carbonyl amino group, an ethoxy carbonyl amino group, a t-butoxy carbonyl amino group, an n-octadecyloxy carbonyl amino group, an N-methyl-methoxy carbonyl amino group and the like.

The aryloxy carbonyl amino groups may be a substituted or unsubstituted aryloxy carbonyl amino group having 7 to 30 carbon atoms. Examples of the substituent of the substituted aryloxy carbonyl amino group include the substituents described for the substituted alkyl group. Examples of the aryloxy carbonyl amino group include a phenoxy carbonyl amino group, a p-chlorophenoxy carbonyl amino group, an m-n-octyloxy phenoxy carbonyl amino group and the like.

The sulfamoyl amino groups may be a substituted or unsubstituted sulfamoyl amino group having 0 to 30 carbon atoms. Examples of the substituent of the substituted sulfamoyl amino group include the substituents described for the substituted alkyl group. Examples of the sulfamoyl amino groups include a sulfamoyl amino group, an N,N-dimethylamino sulfonyl amino group, an N-n-octylamino sulfonylamino group and the like.

The alkyl sulfonyl amino groups may be a substituted or unsubstituted alkyl sulfonyl amino group having 1 to 30 carbon atoms. Examples of the substituent of the substituted alkyl sulfonyl amino group include the substituents described for the substituted alkyl group. Examples of the alkyl sulfonyl amino group include a methyl sulfonyl amino group, a butyl sulfonyl amino group and the like.

The aryl sulfonyl amino groups may be a substituted or unsubstituted aryl sulfonyl amino group having 6 to 30 carbon atoms. Examples of the substituent of the substituted aryl sulfonyl amino group include the substituents described for the substituted alkyl group. Examples of the aryl sulfonyl amino group include a phenyl sulfonyl amino group, a 2,3,5-trichlorophenyl sulfonyl amino group, a p-methyl phenyl sulfonyl amino group and the like.

The alkyl thio groups may be a substituted or unsubstituted alkyl thio group having 1 to 30 carbon atoms. Examples of the substituent of the substituted alkyl thio group include the substituents described for the substituted alkyl group. Examples of the alkyl thio group include a methyl thio group, an ethyl thio group, an n-hexadecyl thio group and the like.

The aryl thio groups may be a substituted or unsubstituted aryl thio group having 6 to 30 carbon atoms. Examples of the substituent of the substituted aryl thio group include the substituents described for the substituted alkyl group. Examples of the aryl thio groups include a phenyl thio group, a p-chlorophenyl thio group, an m-methoxyphenyl thio group and the like.

The heterocyclic thio groups may be a substituted or unsubstituted heterocyclic thio group having 2 to 30 carbon atoms. Examples of the substituent of the substituted heterocyclic thio group include the substituents described for the substituted alkyl group. Examples of the heterocyclic thio groups include a 2-benzothiazolyl thio group, a 1-phenyltetrazol-5-ylthio group and the like.

The sulfamoyl groups may be a substituted or unsubstituted sulfamoyl group having 0 to 30 carbon atoms. Examples of the substituent of the substituted sulfamoyl group include the substituents described for the substituted alkyl group. Examples of the sulfamoyl groups include an N-ethyl sulfamoyl group, an N-(3-dodecyloxy propyl)sulfamoyl group, an N,N-dimethyl sulfamoyl group, an N-acetyl sulfamoyl group, an N-benzoyl sulfamoyl group, an N—(N'-phenyl carbamoyl)sulfamoyl group and the like.

The alkyl sulfinyl groups may be a substituted or unsubstituted alkyl sulfinyl group having 1 to 30 carbon atoms. Examples of the substituent of the substituted alkyl sulfinyl group include the substituents described for the substituted alkyl group. Examples of the alkyl sulfinyl groups include a methyl sulfinyl group, an ethyl sulfinyl group and the like.

The aryl sulfinyl groups may be a substituted or unsubstituted aryl sulfinyl group having 6 to 30 carbon atoms. Examples of the substituent of the substituted aryl sulfinyl group include the substituents described for the substituted alkyl group. Examples of the aryl sulfinyl groups include a phenyl sulfinyl group, a p-methyl phenyl sulfinyl group and the like.

The alkyl sulfonyl groups may be a substituted or unsubstituted alkyl sulfonyl group having 1 to 30 carbon atoms. Examples of the substituent of the substituted alkyl sulfonyl group include the substituents described for the substituted alkyl group. Examples of the alkyl sulfonyl groups include a methyl sulfonyl group, an ethyl sulfonyl group and the like.

The aryl sulfonyl groups may be a substituted or unsubstituted aryl sulfonyl group having 6 to 30 carbon atoms. Examples of the substituent of the substituted aryl sulfonyl group include the substituents described for the substituted alkyl group. Examples of the aryl sulfonyl groups include a phenyl sulfonyl group, a p-toluene sulfonyl group and the like.

The acyl groups may be a formyl group, a substituted or unsubstituted alkyl carbonyl group having 2 to 30 carbon atoms, a substituted or unsubstituted aryl carbonyl group having 7 to 30 carbon atoms, a substituted or unsubstituted heterocyclic carbonyl group having 4 to 30 carbon atoms, bonded to a carbonyl group through a substituted or unsubstituted carbon atom. Examples of the substituent of the substituted alkyl carbonyl group, the substituted aryl carbonyl group, and the substituted heterocyclic carbonyl group include the substituents described for the substituted alkyl group. Examples of the acyl groups include an acetyl group, a pivaloyl group, a 2-chloroacetyl group, a stearoyl group, a benzoyl group, a p-n-octyloxy phenyl carbonyl group, a 2-pyridyl carbonyl group, a 2-furyl carbonyl group and the like.

The aryloxy carbonyl groups may be a substituted or unsubstituted aryloxy carbonyl group having 7 to 30 carbon atoms. Examples of the substituent of the substituted aryloxy carbonyl group include the substituents described for the substituted alkyl group. Examples of the aryloxy carbonyl group include a phenoxy carbonyl group, an o-chlorophenoxy carbonyl group, an m-nitrophenoxy carbonyl group, a p-t-butyl phenoxy carbonyl group and the like.

The alkoxy carbonyl groups may be a substituted or unsubstituted alkoxy carbonyl group having 2 to 30 carbon atoms. Examples of the substituent of the substituted alkoxy carbonyl group include the substituents described for the substituted alkyl group. Examples of the alkoxy carbonyl group include a methoxy carbonyl group, an ethoxy carbonyl group, a t-butoxy carbonyl group, an n-octadecyloxy carbonyl group and the like.

The carbamoyl groups may be a substituted or unsubstituted carbamoyl group having 1 to 30 carbon atoms. Examples of the substituent of the substituted carbamoyl group include the substituents described for the substituted alkyl group. Examples of the carbamoyl group include a carbamoyl group, an N-methyl carbamoyl group, an N,N-dimethyl carbamoyl group, an N,N-di-n-octyl carbamoyl group, an N-(methyl sulfonyl)carbamoyl group and the like.

The phosphino groups may be a substituted or unsubstituted phosphino group having 2 to 30 carbon atoms. Examples of the substituent of the substituted phosphino group include the substituents described for the substituted alkyl group. Examples of the phosphino group include a dimethyl phosphino group, a diphenyl phosphino group, a methyl phenoxy phosphino group and the like.

The phosphinyl groups may be a substituted or unsubstituted phosphinyl group having 2 to 30 carbon atoms. Examples of the substituent of the substituted phosphinyl group include the substituents described for the substituted alkyl group. Examples of the phosphinyl group include a phosphinyl group, a dioctyloxy phosphinyl group, a diethoxy phosphinyl group and the like.

The phosphinyloxy groups may be a substituted or unsubstituted phosphinyloxy group having 2 to 30 carbon atoms. Examples of the substituent of the substituted phosphinyloxy group include the substituents described for the substituted alkyl group. Examples of the phosphinyloxy group include a diphenoxy phosphinyloxy group, a dioctyloxy phosphinyloxy group and the like.

The phosphinyl amino groups may be a substituted or unsubstituted phosphinyl amino group having 2 to 30 carbon atoms. Examples of the substituent of the substituted phosphinyl amino group include the substituents described for the substituted alkyl group. Examples of the phosphinyl amino group include a dimethoxy phosphinyl amino group, a dimethylamino phosphinyl amino group and the like.

The silyl groups may be a substituted or unsubstituted silyl group having 3 to 30 carbon atoms. Examples of the substituent of the substituted silyl group include the substituents described for the substituted alkyl group. Examples of the silyl group include a trimethyl silyl group, a t-butyldimethyl silyl group, a phenyldimethyl silyl group and the like.

Examples of the azo groups include a phenyl azo group, a 4-methoxyphenyl azo group, a 4-pivaloylamino phenyl azo group, a 2-hydroxy-4-propanoyl phenyl azo group and the like.

Examples of the imido group include an N-succinimido group, an N-phthalimido group and the like.

In the general formula (1), $X_1$ and $X_2$, each independently, represents an electron attractive group, provided that $X_1$ and $X_2$ may be the same or different. Examples of $X_1$ and $X_2$ include an acyl group, an acyloxy group, a carbamoyl group, an alkyloxy carbonyl group, an aryloxy carbonyl group, a cyano group, a nitro group, a dialkyl phosphono group, a diaryl phosphono group, a diaryl phosphinyl group, an alkyl sulfinyl group, an aryl sulfinyl group, an alkyl sulfonyl group, an aryl sulfonyl group, a sulfonyloxy group, an acyl thio group, a sulfamoyl group, a thiocyanate group, a thiocarbonyl group, an alkyl halide group, an alkoxy halide group, an aryloxy halide group, an alkylamino halide group, an alkyl thio halide group, an aryl group substituted with another electron attractive group, a heterocyclic group, a halogen atom, an azo group, a selenocyanate group and the like.

Each of the $X_1$ and $X_2$ may be an acyl group having 2 to 12 carbon atoms, an acyloxy group having 2 to 12 carbon atoms, a carbamoyl group having 1 to 12 carbon atoms, an alkyloxy carbonyl group having 2 to 12 carbon atoms, an aryloxy carbonyl group having 7 to 18 carbon atoms, a cyano group, a nitro group, an alkyl sulfinyl group having 1 to 12 carbon atoms, an aryl sulfinyl group having 6 to 18 carbon atoms, an alkyl sulfonyl group having 1 to 12 carbon atoms, an aryl sulfonyl group having 6 to 18 carbon atoms, a sulfamoyl group having 0 to 12 carbon atoms, an alkyl halide group having 1 to 12 carbon atoms, an alkoxy halide group having 1 to 12 carbon atoms, an alkyl thio halide group having 1 to 12 carbon atoms, an aryloxy halide group having 7 to 18 carbon atoms, an aryl group having 7 to 18 carbon atoms, substituted with two or more electron attractive group, and a heterocyclic group which has 1 to 18 carbon atoms, is 5- to 8-membered, and has a nitrogen atom, an oxygen atom, or a sulfur atom.

In the general formula (1), $Z_1$ and $Z_2$, each independently, represents a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, provided that $Z_1$ and $Z_2$ may be the same or different. Examples of the alkyl group, the alkenyl group, the alkynyl group, the aralkyl group, the aryl group, and the heterocyclic group are same in the case of $R_1$, $R_2$, $Y_1$, and $Y_2$.

In the general formula (1), M represents a hydrogen atom, or a cation. The cation is an alkali metal ion, an ammonium ion, or a quaternary ammonium ion. The cation may be Li, Na, K, $NH_4$, or $NR_4$. R is an alkyl group, or an aryl group and examples thereof are same in the case of $R_1$, $R_2$, $Y_1$, and $Y_2$. Out of these, preferred cation is Li, Na, K, or $NH_4$.

As for the combination of the preferred substituents of the dye represented by the general formula (1), preferred is a compound in which at least one of various substituents is the preferred group. More preferred is a compound in which a larger number of various substituents are the preferred groups. Most preferred is a compound in which all the substituents are the preferred substituents.

The particularly preferred combinations for the dye represented by the general formula (1) include the following (I) to (V).

(I) $R_1$ and $R_2$ may be the same or different, preferably a substituted or unsubstituted alkyl group having 1 to 12 carbon atoms, a substituted or unsubstituted aryl group having 6 to 18 carbon atoms, or a substituted or unsubstituted heterocyclic group having 4 to 12 carbon atoms. Out of these, preferred is a straight-chain alkyl group or branched alkyl group having 1 to 8 carbon atoms. Particularly, a secondary or tertiary alkyl group is preferred, and a t-butyl group is most preferred.

(II) $X_1$ and $X_2$, each independently, represents an electron attractive group, may be the same or different, preferably a cyano group, an alkyl sulfonyl group having 1 to 12 carbon atoms, an aryl sulfonyl group having 6 to 18 carbon atoms, or a sulfamoyl group having 0 to 12 carbon atoms. Out of these, a cyano group, or an alkyl sulfonyl group having 1 to 12 carbon atoms is preferred.

(III) $Y_1$ and $Y_2$ may be the same or different, preferably a hydrogen atom, a substituted or unsubstituted alkyl group having 1 to 12 carbon atoms, a substituted or unsubstituted aryl group having 6 to 18 carbon atoms, or a substituted or unsubstituted heterocyclic group having 4 to 12 carbon atoms. Out of these, a hydrogen atom, a substituted or unsubstituted alkyl group is preferred. A hydrogen atom is most preferred.

(IV) $Z_1$ and $Z_2$ may be the same or different, preferably a substituted or unsubstituted alkyl group having 1 to 12 carbon atoms, a substituted or unsubstituted aryl group having 6 to 18 carbon atoms, or a substituted or unsubstituted heterocyclic group having 4 to 12 carbon atoms. The particularly preferred substituent is a substituted or unsubstituted aryl group or a substituted or unsubstituted heterocyclic group. Out of these, particularly, a substituted aryl group is preferred.

(V) M is preferably a hydrogen atom, an alkali metal ion, an ammonium ion, or a quaternary ammonium ion. Out of these, a hydrogen atom, Li, Na, K, or $NH_4$ is preferred.

Examples of the dye (1) comprise compounds represented by the following chemical formulae (1-A) to (1-E). In the following chemical formulae (1-A) to (1-E), $C_4H_9(t)$ represents a t-butyl group.

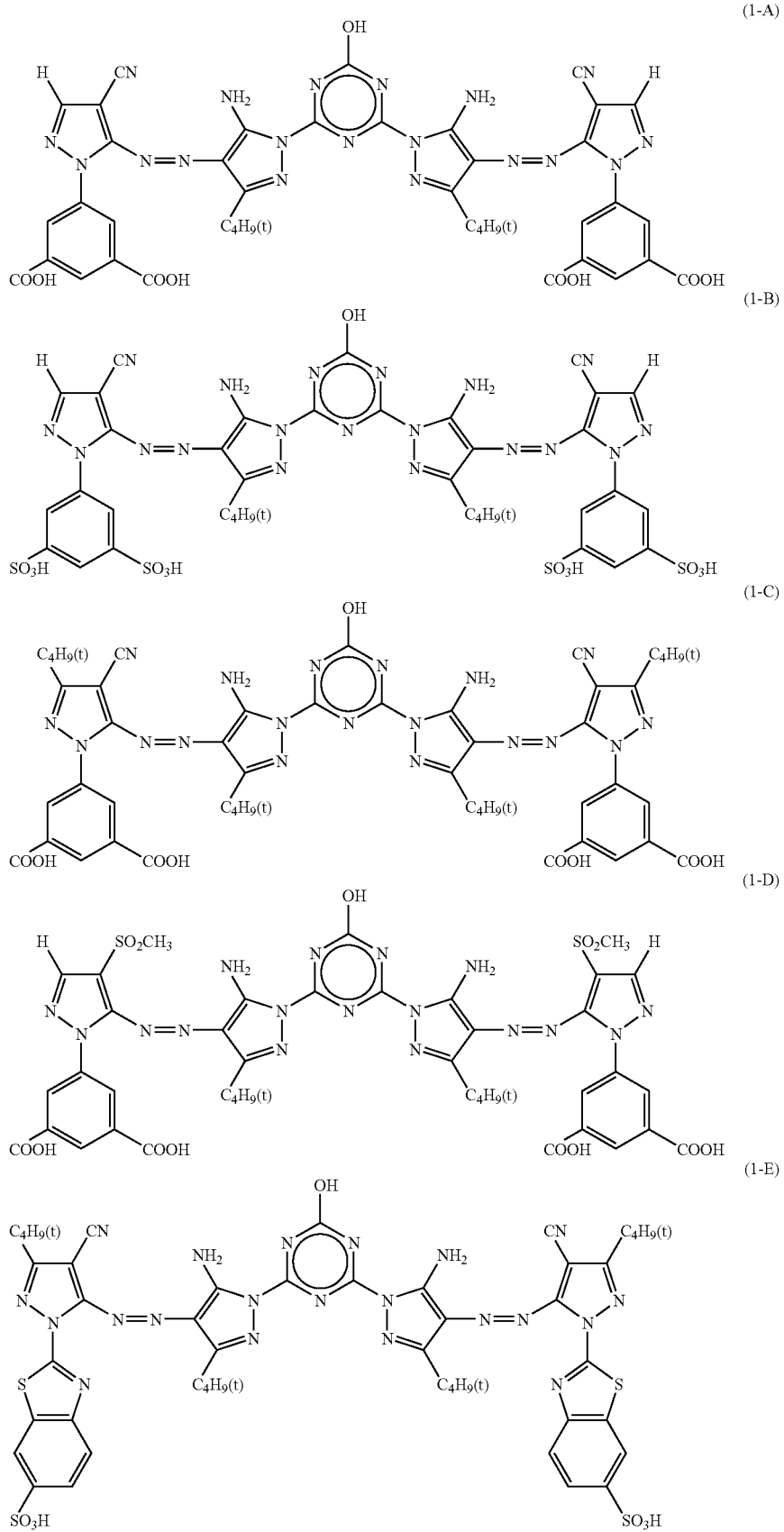

An amount of the dye (1) is not particularly limited. Inclusion of the dye (1) in the water-based ink makes it possible to improve toughness of a recording material recorded using the water-based ink. The amount of the dye (1) relative to the total amount of the ink is, for example, in the range of about 0.06 wt % to about 6.3 wt %, and in the range of about 0.12 wt % to about 4.5 wt %.

As described above, the dye (2) is at least one dye selected from the group consisting of C. I. Direct Yellow 86, C. I. Direct Yellow 132, C. I. Direct Yellow 142, and C. I. Direct Yellow 173.

C. I. Direct Yellow 86 is a dye represented by the following chemical formula (2-1), for example.

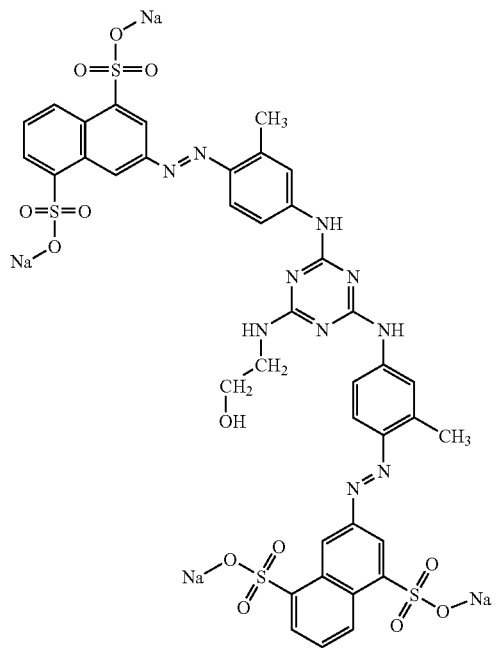

(2-1)

C. I. Direct Yellow 132 is a dye represented by the following chemical formula (2-2), for example.

An amount of the dye (2) is not particularly limited. Inclusion of the dye (2) in the water-based ink makes it possible to improve clearness, color development and preservation stability. The amount of the dye (2) relative to the total amount of the ink is, for example, in the range of about 0.01 wt % to about 2.8 wt %, and in the range of about 0.02 wt % to about 2.0 wt %.

As described above a weight ratio between the dye (1) and the dye (2) in the water-based ink may be in the range of about 6:4 to about 9:1. Setting of the weight ratio in the aforementioned range makes it possible to obtain a water-based ink further good in preservation stability as well as further good in light resistance of a recording material recorded using the water-based ink. The water-based ink for ink-jet recording produces synergistic effect beyond the simple combination of the dye (1) and the dye (2). With respect to the preservation stability, improvement beyond the intermediate level that is the arithmetical average between the dye (1) and the dye (2) may be seen. Further, with respect to the light resistance of the recording material in a condition where the dye (2) comprises C. I. Direct Yellow 173, improvement beyond the intermediate level that is the arithmetical average between the dye (1) and the dye (2) may be seen. Such synergistic effects are proven in Examples described later. In a condition where the dye (2) comprises C. I. Direct Yellow 86, C. I. Direct Yellow 132, or C.I. Direct Yellow 142, the weight ratio between the dye (1) and dye (2) is, for example, in the range of about 7:3 to about 9:1, and in the range of about 8:2 to about 9:1. In a condition where the dye (2) comprises C. I. Direct Yellow 173, when the preservation stability is emphasized, the weight ratio between the dye (1) and the dye (2) is, for example, in the range of about 6:4 to about 7:3. In a condition where the dye (2) comprises C. I. Direct Yellow 173, when the light resistance of the recording material is emphasized, the weight ratio between the dye (1) and the dye (2) is, for example, in the range of about 7:3 to about 9:1. Because the dye (1) is good in the ozone resistance of the recording material, the water-based ink for ink-jet recording using it is good in the ozone resistance of the recording material as well as the preservation stability and the light resistance. Particularly, when the dye (2) comprises C. I. Direct Yellow 173, the water-based ink for ink-jet recording shows very high ozone

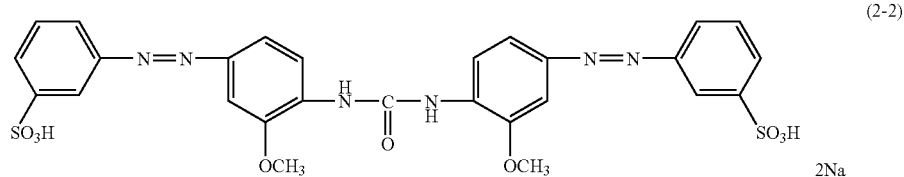

(2-2)

C. I. Direct Yellow 142 is a dye represented by the following chemical formula (2-3), for example.

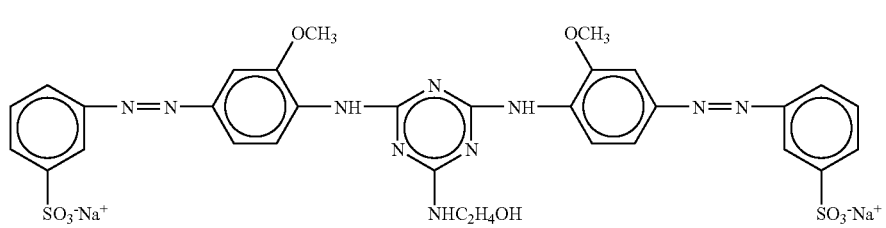

(2-3)

resistance of the recording material because C. I. Direct Yellow 173 also is good in the ozone resistance of the recording material.

A total amount of the dye (1) and the dye (2) is not particularly limited. The total amount of the dye (1) and the dye (2) relative to the total amount of the ink may be in the range of about 0.1 wt % to about 7 wt %, and in the range of about 0.2 wt % to about 5 wt %.

The coloring agent may be composed of the dye (1) and the dye (2) only or may further comprise other dyes or pigments.

The water may be ion-exchange water or purified water. An amount of the water relative to the total amount of the ink is, for example, in the range of about 10 wt % to about 90 wt %, and in the range of about 40 wt % to about 80 wt %. The amount of the water may be a balance of the other components, for example.

The water-soluble organic solvent is classified into a humectant and a penetrant. The humectant prevents ink from drying at a tip of an ink-jet head, for example. The penetrant adjusts a drying rate of ink on a recording paper, for example.

The humectant is not limited. Examples of the humectant include lower alcohol such as methyl alcohol, ethyl alcohol, n-propyl alcohol, isopropyl alcohol, n-butyl alcohol, sec-butyl alcohol, t-butyl alcohol and the like; amide such as dimethylformamide, dimethylacetamide and the like; ketone such as acetone and the like; ketoalcohol such as diacetone alcohol and the like; ether such as tetrahydrofuran, dioxane and the like; polyalcohol such as polyalkylene glycol, alkylene glycol, glycerin and the like; 2-pyrrolidone; N-methyl-2-pyrrolidone; 1,3-dimethyl-2-imidazolidinone; and the like. Examples of the polyalkylene glycol include, without limitation, polyethylene glycol, polypropylene glycol and the like. The alkylene glycol include, without limitation, ethylene glycol, propylene glycol, butylene glycol, diethylene glycol, triethylene glycol, dipropylene glycol, tripropylene glycol, thiodiglycol, hexylene glycol and the like. Among them, polyalcohol such as alkylene glycol and glycerin is preferable. One of the humectants may be used alone or two or more of them may be used in combination.

An amount of the humectant is not particularly limited. The amount of the humectant relative to the total amount of the ink is, for example, in the range of about 0 wt % to about 95 wt %, in the range of about 10 wt % to about 80 wt %, and in the range of about 10 wt % to about 50 wt %.

As the humectant, glycerin is particularly preferable. The glycerin is, as compared to the other solvents, good in safety, dissolved well in water, and good in moisture absorptivity and moisture-retaining property. As described above, an amount of the glycerin relative to the total amount of the ink is, for example, in the range of about 5 wt % to about 40 wt %.

The penetrant is not limited. Examples of the penetrant include glycol ether. Examples of the glycol ether include ethylene glycol methyl ether, ethylene glycol ethyl ether, ethylene glycol propyl ether, diethylene glycol methyl ether, diethylene glycol ethyl ether, diethylene glycol propyl ether, diethylene glycol butyl ether, triethylene glycol methyl ether, triethylene glycol ethyl ether, triethylene glycol propyl ether, triethylene glycol butyl ether, propylene glycol methyl ether, propylene glycol ethyl ether, propylene glycol propyl ether, propylene glycol butyl ether, dipropylene glycol methyl ether, dipropylene glycol ethyl ether, dipropylene glycol propyl ether, dipropylene glycol butyl ether, tripropylene glycol methyl ether, tripropylene glycol ethyl ether, tripropylene glycol propyl ether, tripropylene glycol butyl ether and the like. One of the penetrants may be used alone or two or more of them may be used in combination.

An amount of the penetrant is, for example, in the range of about 0 wt % to about 20 wt %. Setting of the amount of the penetrant in the aforementioned range makes it possible to obtain suitable penetration of the ink relative to a paper. The amount of the penetrant may be in the range of about 0.1 wt % to about 15 wt %, and in the range of about 0.5 wt % to about 10 wt %.

The water-based ink for ink-jet recording may further comprise a conventionally known additive as required. Examples of the additive include a surfactant, a viscosity modifier, a surface tension modifier, and an antifungal agent. Examples of the viscosity modifier include, without limitation, polyvinyl alcohol, cellulose, water-soluble resin and the like.

The water-based ink may be prepared, for example, by uniformly mixing the coloring agent, water, the water-soluble organic solvent with other added components as required by a conventionally known method, and then removing insolubles with a filter or the like.

Further, the water-based ink for ink-jet recording may be used as a water-based ink other than a yellow color by further comprising coloring agents other than the dye (1) and the dye (2).

An ink cartridge comprises the water-based ink for ink-jet recording. As a body of the ink cartridge, for example, a conventionally known body may be used.

Next, an ink-jet recording apparatus is explained. The ink-jet recording apparatus comprises the ink cartridge and an ink ejection unit, and the water-based ink comprised in the ink cartridge is ejected from the ink ejection unit. Other than this, the ink-jet recording apparatus may have the construction similar to that of a conventionally known ink-jet recording apparatus.

FIG. 1 shows a construction of an example of the ink-jet recording apparatus. As shown in FIG. 1, the ink-jet recording apparatus 1 comprises four ink cartridges 2, an ink-jet head 3, a head unit 4, a carriage 5, a drive unit 6, a platen roller 7, and a purge unit 8 as main constructional elements. In the ink-jet recording apparatus 1 of this example, the ink-jet head 3 is the ink ejection unit.

The four ink cartridges 2 each comprise water-based inks of yellow, magenta, cyan, and black. For example, the water-based yellow ink is the water-based ink for ink-jet recording. The ink-jet head 3 performs printing on a recording material P such as a recording paper. The head unit 4 is provided with the ink-jet head 3. The four ink cartridges 2 and the head unit 4 are mounted to the carriage 5. The drive unit 6 reciprocates the carriage 5 in a straight line. The platen roller 7 extends in a reciprocating direction of the carriage 5 and opposes to the ink-jet head 3.

The drive unit 6 comprises a carriage shaft 9, a guide plate 10, a pair of pulleys 11 and 12, and an endless belt 13. The carriage shaft 9 is disposed at a lower end portion of the carriage 5 and extends in parallel to the platen roller 7. The guide plate 10 is disposed at an upper end portion of the carriage 5 and extends in parallel to the carriage shaft 9. The pulleys 11 and 12 are disposed in positions corresponding to both end portions of the carriage shaft 9 and between the carriage shaft 9 and the guide plate 10. The endless belt 13 is stretched between the pulleys 11 and 12.

In the ink-jet recording apparatus 1, as the pulley 11 is rotated in normal and reverse directions by the drive of a carriage motor 101, the carriage 5 which is connected to the endless belt 13 is reciprocated linearly along the carriage shaft 9 and the guide plate 10 in accordance with the rotation of the pulley 11.

The recording material P is fed from a paper feeding cassette (not shown) positioned on a side of or underneath the ink-jet recording apparatus 1. The recording material P is introduced between the ink-jet head 3 and the platen roller 7. Then, a predetermined printing is performed on the recording material P with the ink ejected from the ink-jet head 3. The recording material P then is discharged from the ink-jet recording apparatus 1. In FIG. 1, a feeding mechanism and a discharging mechanism of the recording material P are not shown.

The purge unit 8 is provided on a side of the platen roller 7. The purge unit 8 is disposed so as to oppose the ink-jet head 3 when the head unit 4 is in a reset position (above the purge unit 8 in this example). The purge unit 8 comprises a purge cap 14, a pump 15, a cam 16, and an ink reservoir 17. The purge cap 14 covers a plurality of nozzles (not shown) of the ink-jet head 3 when the head unit 4 is in a reset position. In this state, the pump 15 draws poor ink comprising, for example, air bubbles trapped inside the ink-jet head 3, by being driven by the cam 16. Thereby a recovery of the ink-jet head 3 is promoted. The drawn poor ink is stored in the ink reservoir 17.

A wiper member 20 is provided on the side of platen roller 7 in the purge unit 8. The wiper member 20 has a spatula shape, and wipes a nozzle surface of the ink-jet head 3 in accordance with the movement of the carriage 5. In order to prevent the ink from drying, the cap 18 covers the plurality of nozzles of the ink-jet head 3 that returns to the reset position after the completion of printing.

With respect to the ink-jet recording apparatus 1 of this example, the four ink cartridges 2 are mounted to one carriage 5. However, the present invention is not limited thereto. With respect to the ink-jet recording apparatus of the present invention, the four ink cartridges may be mounted to a plurality of carriages. Further, the four ink cartridges may not be mounted to the carriage, but may be provided and fixed in the ink-jet recording apparatus. In this state, for example, the ink cartridge and the head unit mounted to the carriage are connected via a tube, or the like, and the ink is supplied to the head unit from the ink cartridge.

EXAMPLES

Examples of the present invention are described together with Comparative Examples, which are provided for illustrative purposes only. The present invention is not limited by the following Examples and Comparative Examples.

Examples 1 to 21 and Comparative Examples 1 to 5

An ink composition (Tables 1 to 6) was stirred and then mixed. Thereafter, the mixture was filtered with a hydrophilic polytetrafluoroethylene (PTFE) type membrane filter having a pore diameter of 0.2 μm manufactured by ToyoRoshi Kaisha, Ltd. to produce each water-based ink and thereby obtained the water-based ink for of Examples 1 to 21 and Comparative Examples 1 to 5. In the following Tables 1 to 6, the dyes (1-A) to (1-E), are compounds respectively represented by the chemical formulae (1-A) to (1-E).

With respect to the water-based ink of each Example and Comparative Example, (a) preservation stability evaluation, (b) light resistance evaluation, (c) ozone resistance evaluation, and (d) comprehensive evaluation were carried out with the following method. Further, samples for (b) light resistance evaluation and (c) ozone resistance evaluation were prepared as described below.

First, an ink cartridge was filled up with the water-based ink of each Example and Comparative Example. Next, the ink cartridge was attached to a digital multi-function center DCP-330C, which mounted an ink-jet printer, manufactured by Brother Industries, Ltd. Then, a gradation sample of the ink was printed on a glossy photo paper BP61GLA manufactured by Brother Industries, Ltd, and thereby obtained a patch having an initial Optical density (OD) value of about 1.0. The OD value was measured by a spectrophotometer, Spectrolino, manufactured by Gretag-Macbeth (light source: $D_{65}$; observer: 2°; and status A).

(a-1) Preservation Stability Evaluation 1

The water-based ink of Examples 1 to 15 and Comparative Examples 1 to 4 was diluted with purified water by 1600 times. Absorption of the dilution at wavelength of 440 nm was measured using an ultraviolet-visible-near-infrared spectrophotometer, UV3600, manufactured by Shimadzu Corporation. The measurement was carried out using a measurement cell with a length of 10 mm. Subsequently, the water-based ink was contained in a sealed container and stored for two weeks under an environment of 60° C., separately. Next, the water-based ink after storage was diluted with purified water by 1600 times and absorption of the dilution was measured as same manner as the water-based ink before storage. Then, an absorption reduction rate (%) was obtained with the following formula (I) and preservation stability was evaluated according to the following Evaluation Criteria. When the absorption reduction rate is low, degradation of the dye (1) is inhibited, and it can be said that the water-based ink is good in the preservation stability.

$$\text{Absorption reduction rate } (\%) = ((X-Y)/X) \times 100 \quad (I)$$

X: Absorption before storage
Y: Absorption after storage
Preservation Stability Evaluation Criteria 1
G: absorption reduction rate is less than 10%
NG: absorption reduction rate is 10% or more (a-2) Preservation Stability Evaluation 2

Preservation stability of each water-based ink of Examples 16 to 21 and Comparative Examples 1 and 5 was evaluated according to the following Evaluation Criteria in the same manner as the preservation stability evaluation 1 except that the water-based ink was stored for a week under an environment of 70° C.

Preservation Stability Evaluation Criteria 2
G: absorption reduction rate is less than 6%
NG: absorption reduction rate is 6% or more (b-1) Light Resistance Evaluation 1

Using a high power energy xenon weather meter, SC750-WN, manufactured by SUGA TEST INSTRUMENTS CO., LTD., xenon lamp light was irradiated onto the gradation sample of Examples 1 to 10 and Comparative Examples 1 to 3 for 200 hours under the following condition. That is, a chamber temperature of 25° C., a chamber relative humidity of 50%, and an illuminance of 93 klx. Next, the OD value of the patch after irradiation was measured in the same manner as described above. Then, the OD value reduction rate (%) was obtained with the following formula (II) and the light resistance was evaluated according to the following Evaluation Criteria. The lower the OD value reduction rate is, the fewer the deterioration of the image, and it can be said that the ink is good in the light resistance.

$$\text{OD value reduction rate } (\%) = ((X-Y)/X) \times 100 \quad (II)$$

X: 1.0 (initial OD value)
Y: OD value after irradiation
Light Resistance Evaluation Criteria 1
G: OD value reduction rate is less than 30%
NG: OD value reduction rate is 30% or more (b-2) Light Resistance Evaluation 2

Light resistance of Examples 11 to 21 and Comparative Examples 1, 4, and 5 was evaluated according to the following Evaluation Criteria in the same manner as the light resistance evaluation 1 except that the xenon lamp light was irradiated onto the gradation sample for 150 hours.

Light Resistance Evaluation Criteria 2
G: OD value reduction rate is less than 20%
NG: OD value reduction rate is 20% or more (c) Ozone Resistance Evaluation Using an ozone weather meter, OMS-H, manufactured by SUGA TEST INSTRUMENTS CO., LTD., the gradation sample of Examples 1 to 15 and Comparative Examples 1 to 4 was left for 40 hours under the following condition. That is, an ozone concentration of 2 ppm, a chamber temperature of 24° C. and a chamber relative humidity of 60%. Next, the OD value of the patch after leave was measured in the same manner as described above. Then, the OD value reduction rate (%) was obtained with the following formula (III) and the ozone resistance was evaluated according to the following Evaluation Criteria. The lower the OD value reduction rate is, the fewer the deterioration of the image, and it can be said that the water-based ink is good in the ozone resistance.

$$\text{OD value reduction rate (\%)} = ((X-Y)/X) \times 100 \quad \text{(III)}$$

X: 1.0 (initial OD value)
Y: OD value after leave
Ozone Resistance Evaluation Criteria
G: OD value reduction rate is less than 20%
NG: OD value reduction rate is 20% or more (d) Comprehensive Evaluation With respect to the water-based ink of each Example and Comparative Example, from the results of (a) to (c), the comprehensive evaluation was carried out according to the following Evaluation Criteria.

Comprehensive Evaluation Criteria
G: all evaluation results were "G"
NG: "NG" was found in one or more of the evaluation results Ink compositions and evaluation results of the water-based ink of each Example and Comparative Example are indicated in Tables 1 to 6. In tables 1 to 6, each predictive value of the absorption reduction rate in the preservation stability evaluations 1 and 2, and each predictive value of the OD value reduction rate in the light resistance evaluation 2 indicate an intermediate level that is the arithmetical average between the dye (1) and the dye (2).

TABLE 1

|  | Example 1 | Example 2 | Example 3 | Example 4 | Example 5 |
|---|---|---|---|---|---|
| INK COMPOSITION (wt %) | | | | | |
| dye(1) | | | | | |
| dye(1-A) | 2.43 | — | — | — | — |
| dye(1-B) | — | 2.16 | — | — | — |
| dye(1-C) | — | — | 1.89 | — | — |
| dye(1-D) | — | — | — | 1.75 | — |
| dye(1-E) | — | — | — | — | 2.45 |
| dye(2) | | | | | |
| C.I. Direct Yellow 86 | 0.27 | 0.54 | 0.81 | 0.75 | 1.05 |
| Glycerin | 27.0 | 27.0 | 27.0 | 27.0 | 27.0 |
| Dipropylene glycol-n-propyl ether | 2.0 | 2.0 | 2.0 | 2.0 | 2.0 |
| OLFIN ® E1010 (1*) | 0.2 | 0.2 | 0.2 | 0.2 | 0.2 |
| Proxel XL-2(S) (2*) | 0.2 | 0.2 | 0.2 | 0.2 | 0.2 |
| Water | Balance | Balance | Balance | Balance | Balance |
| dye(1):dye(2) (weight ratio) | 90:10 | 80:20 | 70:30 | 70:30 | 70:30 |
| Total amount of dyes (wt %) | 2.7 | 2.7 | 2.7 | 2.5 | 3.5 |
| EVALUATION | | | | | |
| Preservation Stability Evaluation 1 | G | G | G | G | G |
| Absorption reduction rate (predictive value) | 11.1% | 10.2% | 9.3% | 9.3% | 9.3% |
| Absorption reduction rate (actual measurement value) | 7% | 7% | 7% | 6% | 7% |
| Light Resistance Evaluation 1 | G | G | G | G | G |
| OD value reduction rate | 12% | 18% | 23% | 25% | 22% |
| Ozone Resistance Evaluation | G | G | G | G | G |
| OD value reduction rate | 7% | 14% | 14% | 16% | 14% |
| Comprehensive Evaluation | G | G | G | G | G |

(1*) acetylene glycol surfactant (ethylene oxide (10 mol) additive of diol) manufactured by Nissin Chemical Industry Co., Ltd
(2*) dipropylene glycol solution containing antifungal agent, 1,2-benzisothiazolin-3-on (20 wt %) manufactured by Arch Chemicals Japan

TABLE 2

|  | Example 6 | Example 7 | Example 8 | Example 9 | Example 10 |
|---|---|---|---|---|---|
| INK COMPOSITION (wt %) | | | | | |
| dye(1) | | | | | |
| dye(1-A) | 2.43 | — | — | — | — |
| dye(1-B) | — | 2.16 | — | — | — |
| dye(1-C) | — | — | 1.89 | — | — |
| dye(1-D) | — | — | — | 1.75 | — |
| dye(1-E) | — | — | — | — | 2.45 |
| dye(2) | | | | | |
| C.I. Direct Yellow 132 | 0.27 | 0.54 | 0.81 | 0.75 | 1.05 |
| Glycerin | 27.0 | 27.0 | 27.0 | 27.0 | 27.0 |
| Dipropylene glycol-n-propyl ether | 2.0 | 2.0 | 2.0 | 2.0 | 2.0 |
| OLFIN ® E1010 (1*) | 0.2 | 0.2 | 0.2 | 0.2 | 0.2 |
| Proxel XL-2(S) (2*) | 0.2 | 0.2 | 0.2 | 0.2 | 0.2 |
| Water | Balance | Balance | Balance | Balance | Balance |
| dye(1):dye(2) (weight ratio) | 90:10 | 80:20 | 70:30 | 70:30 | 70:30 |
| Total amount of dyes (wt %) | 2.7 | 2.7 | 2.7 | 2.5 | 3.5 |
| EVALUATION | | | | | |
| Preservation Stability Evaluation 1 | G | G | G | G | G |
| Absorption reduction rate (predictive value) | 11% | 10% | 9% | 9% | 9% |
| Absorption reduction rate (actual measurement value) | 8% | 7% | 7% | 6% | 7% |
| Light Resistance Evaluation 1 | G | G | G | G | G |
| OD value reduction rate | 13% | 19% | 24% | 25% | 24% |
| Ozone Resistance Evaluation | G | G | G | G | G |
| OD value reduction rate | 8% | 12% | 17% | 17% | 16% |
| Comprehensive Evaluation | G | G | G | G | G |

(1*) acetylene glycol surfactant (ethylene oxide (10 mol) additive of diol) manufactured by Nissin Chemical Industry Co., Ltd
(2*) dipropylene glycol solution containing antifungal agent, 1,2-benzisothiazolin-3-on (20 wt %) manufactured by Arch Chemicals Japan

TABLE 3

|  | Example 11 | Example 12 | Example 13 | Example 14 | Example 15 |
|---|---|---|---|---|---|
| INK COMPOSITION (wt %) | | | | | |
| dye(1) | | | | | |
| dye(1-A) | 2.43 | — | — | — | — |
| dye(1-B) | — | 2.16 | — | — | — |
| dye(1-C) | — | — | 1.89 | — | — |
| dye(1-D) | — | — | — | 1.75 | — |
| dye(1-E) | — | — | — | — | 2.45 |
| dye(2) | | | | | |
| C.I. Direct Yellow 142 | 0.27 | 0.54 | 0.81 | 0.75 | 1.05 |
| Glycerin | 27.0 | 27.0 | 27.0 | 27.0 | 27.0 |
| Dipropylene glycol-n-propyl ether | 2.0 | 2.0 | 2.0 | 2.0 | 2.0 |
| OLFIN ® E1010 (1*) | 0.2 | 0.2 | 0.2 | 0.2 | 0.2 |
| Proxel XL-2(S) (2*) | 0.2 | 0.2 | 0.2 | 0.2 | 0.2 |
| Water | Balance | Balance | Balance | Balance | Balance |
| dye(1):dye(2) (weight ratio) | 90:10 | 80:20 | 70:30 | 70:30 | 70:30 |
| Total amount of dyes (wt %) | 2.7 | 2.7 | 2.7 | 2.5 | 3.5 |
| EVALUATION | | | | | |
| Preservation Stability Evaluation 1 | G | G | G | G | G |

TABLE 3-continued

|  | Example 11 | Example 12 | Example 13 | Example 14 | Example 15 |
|---|---|---|---|---|---|
| Absorption reduction rate (predictive value) | 10.8% | 9.6% | 8.4% | 8.4% | 8.4% |
| Absorption reduction rate (actual measurement value) | 7.1% | 6.2% | 3.1% | 3.9% | 3.3% |
| Light Resistance Evaluation 2 | G | G | G | G | G |
| OD value reduction rate | 6.9% | 9.5% | 14.3% | 14.0% | 14.3% |
| Ozone Resistance Evaluation | G | G | G | G | G |
| OD value reduction rate | 6.3% | 5.0% | 6.3% | 5.2% | 6.2% |
| Comprehensive Evaluation | G | G | G | G | G |

(1*) acetylene glycol surfactant (ethylene oxide (10 mol) additive of diol) manufactured by Nissin Chemical Industry Co., Ltd
(2*) dipropylene glycol solution containing antifungal agent, 1,2-benzisothiazolin-3-on (20 wt %) manufactured by Arch Chemicals Japan

TABLE 4

|  | Example 16 | Example 17 | Example 18 |
|---|---|---|---|
| INK COMPOSITION (wt %) | | | |
| dye(1) | | | |
| dye(1-A) | 2.43 | — | — |
| dye(1-B) | — | 2.16 | — |
| dye(1-C) | — | — | 1.89 |
| dye(2) | | | |
| C.I. Direct Yellow 173 | 0.27 | 0.54 | 0.81 |
| Glycerin | 27.0 | 27.0 | 27.0 |
| Dipropylene glycol-n-propyl ether | 2.0 | 2.0 | 2.0 |
| OLFIN ® E1010 (1*) | 0.2 | 0.2 | 0.2 |
| Proxel XL-2(S) (2*) | 0.2 | 0.2 | 0.2 |
| Water | Balance | Balance | Balance |
| dye(1):dye(2) (weight ratio) | 90:10 | 80:20 | 70:30 |
| Total amount of dyes (wt %) | 2.7 | 2.7 | 2.7 |
| EVALUATION | | | |
| Preservation Stability Evaluation 2 | G | G | G |
| Absorption reduction rate (predictive value) | 5.9% | 5.2% | 4.6% |
| Absorption reduction rate (actual measurement value) | 4.2% | 3.6% | 2.8% |
| Light Resistance Evaluation 2 | G | G | G |
| OD value reduction rate (predictive value) | 5.4% | 7.8% | 10.2% |
| OD value reduction rate (actual measurement value) | 3.0% | 5.3% | 6.8% |
| Comprehensive Evaluation | G | G | G |

(1*) acetylene glycol surfactant (ethylene oxide (10 mol) additive of diol) manufactured by Nissin Chemical Industry Co., Ltd
(2*) dipropylene glycol solution containing antifungal agent, 1,2-benzisothiazolin-3-on (20 wt %) manufactured by Arch Chemicals Japan

TABLE 5

|  | Example 19 | Example 20 | Example 21 |
|---|---|---|---|
| INK COMPOSITION (wt %) | | | |
| dye(1) | | | |
| dye(1-A) | — | — | 1.62 |
| dye(1-D) | 1.75 | — | — |
| dye(1-E) | — | 2.45 | — |
| dye(2) | | | |
| C.I. Direct Yellow 173 | 0.75 | 1.05 | 1.08 |
| Glycerin | 27.0 | 27.0 | 27.0 |
| Dipropylene glycol-n-propyl ether | 2.0 | 2.0 | 2.0 |
| OLFIN ® E1010 (1*) | 0.2 | 0.2 | 0.2 |
| Proxel XL-2(S) (2*) | 0.2 | 0.2 | 0.2 |
| Water | Balance | Balance | Balance |
| dye(1):dye(2) (weight ratio) | 70:30 | 70:30 | 60:40 |
| Total amount of dyes (wt %) | 2.5 | 3.5 | 2.7 |
| EVALUATION | | | |
| Preservation Stability Evaluation 2 | G | G | G |
| Absorption reduction rate (predictive value) | 4.6% | 4.6% | 3.9% |
| Absorption reduction rate (actual measurement value) | 2.9% | 2.6% | 2.0% |
| Light Resistance Evaluation 2 | G | G | G |
| OD value reduction rate (predictive value) | 10.2% | 10.2% | 12.6% |
| OD value reduction rate (actual measurement value) | 5.1% | 5.6% | 6.9% |
| Comprehensive Evaluation | G | G | G |

(1*) acetylene glycol surfactant (ethylene oxide (10 mol) additive of diol) manufactured by Nissin Chemical Industry Co., Ltd
(2*) dipropylene glycol solution containing antifungal agent, 1,2-benzisothiazolin-3-on (20 wt %) manufactured by Arch Chemicals Japan

TABLE 6

|  | Comparative Example 1 | Comparative Example 2 | Comparative Example 3 | Comparative Example 4 | Comparative Example 5 |
|---|---|---|---|---|---|
| INK COMPOSITION (wt %) | | | | | |
| dye(1) | | | | | |
| dye(1-A) | 2.7 | — | — | — | — |
| dye(2) | | | | | |
| C.I. Direct Yellow 86 | — | 2.7 | — | — | — |
| C.I. Direct Yellow 132 | — | — | 2.7 | — | — |
| C.I. Direct Yellow 142 | — | — | — | 2.7 | — |
| C.I. Direct Yellow 173 | — | — | — | — | 2.7 |
| Glycerin | 27.0 | 27.0 | 27.0 | 27.0 | 27.0 |
| Dipropylene glycol-n-propyl ether | 2.0 | 2.0 | 2.0 | 2.0 | 2.0 |
| OLFIN ® E1010 (1*) | 0.2 | 0.2 | 0.2 | 0.2 | 0.2 |
| Proxel XL-2(S) (2*) | 0.2 | 0.2 | 0.2 | 0.2 | 0.2 |
| Water | Balance | Balance | Balance | Balance | Balance |
| dye(1):dye(2) (weight ratio) | 100:0 | 0:100 | 0:100 | 0:100 | 0:100 |
| Total amount of dyes (wt %) | 2.7 | 2.7 | 2.7 | 2.7 | 2.7 |
| EVALUATION | | | | | |
| Preservation Stability Evaluation 1 | NG | G | G | G | — |
| Absorption reduction rate (actual measurement value) | 12% | 3% | 2% | 0.16% | — |
| Preservation Stability Evaluation 2 | NG | — | — | — | G |
| Absorption reduction rate (actual measurement value) | 6.5% | — | — | — | 0.0% |
| Light Resistance Evaluation 1 | G | NG | NG | — | — |
| OD value reduction rate | 7% | 60% | 63% | — | — |
| Light Resistance Evaluation 2 | G | — | — | NG | NG |
| OD value reduction rate (actual measurement value) | 3.0% | — | — | 56.8% | 27.0% |
| Ozone Resistance Evaluation | G | NG | NG | NG | — |
| OD value reduction rate | 4% | 38% | 46% | 20% | — |
| Comprehensive Evaluation | NG | NG | NG | NG | NG |

(1*) acetylene glycol surfactant (ethylene oxide (10 mol) additive of diol) manufactured by Nissin Chemical Industry Co., Ltd
(2*) dipropylene glycol solution containing antifungal agent, 1,2-benzisothiazolin-3-on (20 wt %) manufactured by Arch Chemicals Japan As summarized in Tables 1 to 6, the following information was obtained by each Example and Comparative Example.

Examples 1 to 5

Using C. I. Direct Yellow 86 as Dye (2)

Example 1 (total amount of dyes: 2.7 wt %): Inclusion of the dye (1) for 90% in a weight ratio between the dye (1) and the dye (2) makes it possible to obtain good results in the light resistance evaluation and the ozone resistance evaluation. Further, inclusion of the dye (2) for 10% in a weight ratio between the dye (1) and the dye (2) makes it possible to obtain a good result in the preservation stability evaluation because decrease of absorption due to degradation of the dye (1) is inhibited. This improvement of the absorption reduction rate in the preservation stability evaluation exceeds the intermediate level that is the arithmetical average between the dye (1) and the dye (2) (a predictive value) by about 4%.

Example 2 (total amount of dyes: 2.7 wt %): Inclusion of the dye (1) for 80% in a weight ratio between the dye (1) and the dye (2) makes it possible to obtain good results in the light resistance evaluation and the ozone resistance evaluation. Further, inclusion of the dye (2) for 20% in a weight ratio between the dye (1) and the dye (2) makes it possible to obtain a good result in the preservation stability evaluation because decrease of absorption due to degradation of the dye (1) is inhibited. This improvement of the absorption reduction rate in the preservation stability evaluation exceeds the intermediate level that is the arithmetical average between the dye (1) and the dye (2) (a predictive value) by about 3%.

Example 3 (total amount of dyes: 2.7 wt %): Inclusion of the dye (1) for 70% in a weight ratio between the dye (1) and the dye (2) makes it possible to obtain good results in the light resistance evaluation and the ozone resistance evaluation. Further, inclusion of the dye (2) for 30% in a weight ratio between the dye (1) and the dye (2) makes it possible to obtain a good result in the preservation stability evaluation because decrease of absorption due to degradation of the dye (1) is inhibited. This improvement of the absorption reduction rate in the preservation stability evaluation exceeds the intermediate level that is the arithmetical average between the dye (1) and the dye (2) (a predictive value) by about 2%.

Example 4 (total amount of dyes: 2.5 wt %): Inclusion of the dye (1) for 70% in a weight ratio between the dye (1) and the dye (2) makes it possible to obtain good results in the light resistance evaluation and the ozone resistance evaluation. Further, inclusion of the dye (2) for 30% in a weight ratio between the dye (1) and the dye (2) makes it possible to obtain a good result in the preservation stability evaluation because decrease of absorption due to degradation of the dye (1) is inhibited. This improvement of the absorption reduction rate in the preservation stability evaluation exceeds the intermediate level that is the arithmetical average between the dye (1) and the dye (2) (a predictive value) by about 3%.

Example 5 (total amount of dyes: 3.5 wt %): Inclusion of the dye (1) for 70% in a weight ratio between the dye (1) and the dye (2) makes it possible to obtain good results in the light resistance evaluation and the ozone resistance evaluation. Further, inclusion of the dye (2) for 30% in a weight ratio between the dye (1) and the dye (2) makes it possible to obtain a good result in the preservation stability evaluation because decrease of absorption due to degradation of the dye (1) is inhibited. This improvement of the absorption reduction rate in the preservation stability evaluation exceeds the intermediate level that is the arithmetical average between the dye (1) and the dye (2) (a predictive value) by about 2%.

Examples 6 to 10

Using C. I. Direct Yellow 132 as Dye (2)

Example 6 (total amount of dyes: 2.7 wt %): Inclusion of the dye (1) for 90% in a weight ratio between the dye (1) and the dye (2) makes it possible to obtain good results in the light resistance evaluation and the ozone resistance evaluation. Further, inclusion of the dye (2) for 10% in a weight ratio between the dye (1) and the dye (2) makes it possible to obtain a good result in the preservation stability evaluation because decrease of absorption due to degradation of the dye (1) is inhibited. This improvement of the absorption reduction rate in the preservation stability evaluation exceeds the intermediate level that is the arithmetical average between the dye (1) and the dye (2) (a predictive value) by 3%.

Example 7 (total amount of dyes: 2.7 wt %): Inclusion of the dye (1) for 80% in a weight ratio between the dye (1) and the dye (2) makes it possible to obtain good results in the light resistance evaluation and the ozone resistance evaluation. Further, inclusion of the dye (2) for 20% in a weight ratio between the dye (1) and the dye (2) makes it possible to obtain a good result in the preservation stability evaluation because decrease of absorption due to degradation of the dye (1) is inhibited. This improvement of the absorption reduction rate in the preservation stability evaluation exceeds the intermediate level that is the arithmetical average between the dye (1) and the dye (2) (a predictive value) by 3%.

Example 8 (total amount of dyes: 2.7 wt %): Inclusion of the dye (1) for 70% in a weight ratio between the dye (1) and the dye (2) makes it possible to obtain good results in the light resistance evaluation and the ozone resistance evaluation. Further, inclusion of the dye (2) for 30% in a weight ratio between the dye (1) and the dye (2) makes it possible to obtain a good result in the preservation stability evaluation because decrease of absorption due to degradation of the dye (1) is inhibited. This improvement of the absorption reduction rate in the preservation stability evaluation exceeds the intermediate level that is the arithmetical average between the dye (1) and the dye (2) (a predictive value) by 2%.

Example 9 (total amount of dyes: 2.5 wt %): Inclusion of the dye (1) for 70% in a weight ratio between the dye (1) and the dye (2) makes it possible to obtain good results in the light resistance evaluation and the ozone resistance evaluation. Further, inclusion of the dye (2) for 30% in a weight ratio between the dye (1) and the dye (2) makes it possible to obtain a good result in the preservation stability evaluation because decrease of absorption due to degradation of the dye (1) is inhibited. This improvement of the absorption reduction rate in the preservation stability evaluation exceeds the intermediate level that is the arithmetical average between the dye (1) and the dye (2) (a predictive value) by 3%.

Example 10 (total amount of dyes: 3.5 wt %): Inclusion of the dye (1) for 70% in a weight ratio between the dye (1) and the dye (2) makes it possible to obtain good results in the light resistance evaluation and the ozone resistance evaluation. Further, inclusion of the dye (2) for 30% in a weight ratio between the dye (1) and the dye (2) makes it possible to obtain a good result in the preservation stability evaluation because decrease of absorption due to degradation of the dye (1) is inhibited. This improvement of the absorption reduction rate in the preservation stability evaluation exceeds the intermediate level that is the arithmetical average between the dye (1) and the dye (2) (a predictive value) by 2%.

Examples 11 to 15

Using C. I. Direct Yellow 142 as Dye (2)

Example 11 (total amount of dyes: 2.7 wt %): Inclusion of the dye (1) for 90% in a weight ratio between the dye (1) and the dye (2) makes it possible to obtain good results in the light resistance evaluation and the ozone resistance evaluation. Further, inclusion of the dye (2) for 10% in a weight ratio between the dye (1) and the dye (2) makes it possible to obtain a good result in the preservation stability evaluation because decrease of absorption due to degradation of the dye (1) is inhibited. This improvement of the absorption reduction rate in the preservation stability evaluation exceeds the intermediate level that is the arithmetical average between the dye (1) and the dye (2) (a predictive value) by about 4%.

Example 12 (total amount of dyes: 2.7 wt %): Inclusion of the dye (1) for 80% in a weight ratio between the dye (1) and the dye (2) makes it possible to obtain good results in the light resistance evaluation and the ozone resistance evaluation. Further, inclusion of the dye (2) for 20% in a weight ratio between the dye (1) and the dye (2) makes it possible to obtain a good result in the preservation stability evaluation because decrease of absorption due to degradation of the dye (1) is inhibited. This improvement of the absorption reduction rate in the preservation stability evaluation exceeds the intermediate level that is the arithmetical average between the dye (1) and the dye (2) (a predictive value) by about 3.5%.

Example 13 (total amount of dyes: 2.7 wt %): Inclusion of the dye (1) for 70% in a weight ratio between the dye (1) and the dye (2) makes it possible to obtain good results in the light resistance evaluation and the ozone resistance evaluation. Further, inclusion of the dye (2) for 30% in a weight ratio between the dye (1) and the dye (2) makes it possible to obtain a good result in the preservation stability evaluation because decrease of absorption due to degradation of the dye (1) is inhibited. This improvement of the absorption reduction rate in the preservation stability evaluation exceeds the intermediate level that is the arithmetical average between the dye (1) and the dye (2) (a predictive value) by about 5%.

Example 14 (total amount of dyes: 2.5 wt %): Inclusion of the dye (1) for 70% in a weight ratio between the dye (1) and the dye (2) makes it possible to obtain good results in the light resistance evaluation and the ozone resistance evaluation. Further, inclusion of the dye (2) for 30% in a weight ratio between the dye (1) and the dye (2) makes it possible to obtain a good result in the preservation stability evaluation because decrease of absorption due to degradation of the dye (1) is inhibited. This improvement of the absorption reduction rate in the preservation stability evaluation exceeds the intermediate level that is the arithmetical average between the dye (1) and the dye (2) (a predictive value) by about 4.5%.

Example 15 (total amount of dyes: 3.5 wt %): Inclusion of the dye (1) for 70% in a weight ratio between the dye (1) and the dye (2) makes it possible to obtain good results in the light resistance evaluation and the ozone resistance evaluation. Further, inclusion of the dye (2) for 30% in a weight ratio between the dye (1) and the dye (2) makes it possible to obtain a good result in the preservation stability evaluation because decrease of absorption due to degradation of the dye (1) is inhibited. This improvement of the absorption reduction rate in the preservation stability evaluation exceeds the intermediate level that is the arithmetical average between the dye (1) and the dye (2) (a predictive value) by about 5%.

Examples 16 to 21

Using C. I. Direct Yellow 173 as Dye (2)

Example 16 (total amount of dyes: 2.7 wt %): Inclusion of the dye (1) for 90% in a weight ratio between the dye (1) and the dye (2) makes it possible to obtain a good result in the light resistance evaluation. This improvement of the OD value reduction rate in the light resistance evaluation exceeds the intermediate level that is the arithmetical average between the dye (1) and the dye (2) (a predictive value) by 2.4%. Further, inclusion of the dye (2) for 10% in a weight ratio between the dye (1) and the dye (2) makes it possible to obtain a good result in the preservation stability evaluation because decrease of absorption due to degradation of the dye (1) is inhibited. This improvement of the absorption reduction rate in the preservation stability evaluation exceeds the intermediate level that is the arithmetical average between the dye (1) and the dye (2) (a predictive value) by about 1.5%.

Example 17 (total amount of dyes: 2.7 wt %): Inclusion of the dye (1) for 80% in a weight ratio between the dye (1) and the dye (2) makes it possible to obtain a good result in the light resistance evaluation. This improvement of the OD value reduction rate in the light resistance evaluation exceeds the intermediate level that is the arithmetical average between the dye (1) and the dye (2) (a predictive value) by 2.5%. Further, inclusion of the dye (2) for 20% in a weight ratio between the dye (1) and the dye (2) makes it possible to obtain a good result in the preservation stability evaluation because decrease of absorption due to degradation of the dye (1) is inhibited. This improvement of the absorption reduction rate in the preservation stability evaluation exceeds the intermediate level that is the arithmetical average between the dye (1) and the dye (2) (a predictive value) by about 1.5%.

Example 18 (total amount of dyes: 2.7 wt %): Inclusion of the dye (1) for 70% in a weight ratio between the dye (1) and the dye (2) makes it possible to obtain a good result in the light resistance evaluation. This improvement of the OD value reduction rate in the light resistance evaluation exceeds the intermediate level that is the arithmetical average between the dye (1) and the dye (2) (a predictive value) by 3.4%. Further, inclusion of the dye (2) for 30% in a weight ratio between the dye (1) and the dye (2) makes it possible to obtain a good result in the preservation stability evaluation because decrease of absorption due to degradation of the dye (1) is inhibited. This improvement of the absorption reduction rate in the preservation stability evaluation exceeds the intermediate level that is the arithmetical average between the dye (1) and the dye (2) (a predictive value) by about 2%.

Example 19 (total amount of dyes: 2.5 wt %): Inclusion of the dye (1) for 70% in a weight ratio between the dye (1) and the dye (2) makes it possible to obtain a good result in the light resistance evaluation. This improvement of the OD value reduction rate in the light resistance evaluation exceeds the intermediate level that is the arithmetical average between the dye (1) and the dye (2) (a predictive value) by 5.1%. Further, inclusion of the dye (2) for 30% in a weight ratio between the dye (1) and the dye (2) makes it possible to obtain a good result in the preservation stability evaluation because decrease of absorption due to degradation of the dye (1) is inhibited. This improvement of the absorption reduction rate in the preservation stability evaluation exceeds the intermediate level that is the arithmetical average between the dye (1) and the dye (2) (a predictive value) by about 1.5%.

Example 20 (total amount of dyes: 3.5 wt %): Inclusion of the dye (1) for 70% in a weight ratio between the dye (1) and the dye (2) makes it possible to obtain a good result in the light resistance evaluation. This improvement of the OD value reduction rate in the light resistance evaluation exceeds the intermediate level that is the arithmetical average between the dye (1) and the dye (2) (a predictive value) by 4.6%. Further, inclusion of the dye (2) for 30% in a weight ratio between the dye (1) and the dye (2) makes it possible to obtain a good result in the preservation stability evaluation because decrease of absorption due to degradation of the dye (1) is inhibited. This improvement of the absorption reduction rate in the preservation stability evaluation exceeds the intermediate level that is the arithmetical average between the dye (1) and the dye (2) (a predictive value) by 2%.

Example 21 (total amount of dyes: 2.7 wt %): Inclusion of the dye (1) for 60% in a weight ratio between the dye (1) and the dye (2) makes it possible to obtain a good result in the light resistance evaluation. This improvement of the OD value reduction rate in the light resistance evaluation exceeds the intermediate level that is the arithmetical average between the dye (1) and the dye (2) (a predictive value) by 5.7%. Further, inclusion of the dye (2) for 40% in a weight ratio between the dye (1) and the dye (2) makes it possible to obtain a good result in the preservation stability evaluation because decrease of absorption due to degradation of the dye (1) is inhibited. This improvement of the absorption reduction rate in the preservation stability evaluation exceeds the intermediate level that is the arithmetical average between the dye (1) and the dye (2) (a predictive value) by about 2%.

Comparative Examples 1 to 5

Comparative Example 1 (total amount of dyes: 2.7 wt %): Inclusion of the dye (1) makes it possible to obtain good results in the light resistance evaluation and the ozone resistance evaluation. However, since the water-based ink of Comparative Example 1 does not comprise the dye (2), it was inferior in the result in the preservation stability evaluation.

Comparative Example 2 (total amount of dyes: 2.7 wt %): Inclusion of C. I. Direct Yellow 86 as the dye (2) makes it possible to obtain good result in the preservation stability evaluation. However, since the water-based ink of Comparative Example 2 does not comprise the dye (1), it was inferior in the results in the light resistance evaluation and the ozone resistance evaluation.

Comparative Example 3 (total amount of dyes: 2.7 wt %): Inclusion of C. I. Direct Yellow 132 as the dye (2) makes it possible to obtain good result in the preservation stability evaluation. However, since the water-based ink of Comparative Example 3 does not comprise the dye (1), it was inferior in the results in the light resistance evaluation and the ozone resistance evaluation.

Comparative Example 4 (total amount of dyes: 2.7 wt %): Inclusion of C. I. Direct Yellow 142 as the dye (2) makes it possible to obtain good result in the preservation stability evaluation. However, since the water-based ink of Comparative Example 4 does not comprise the dye (1), it was inferior in the result in the light resistance evaluation and the ozone resistance evaluation.

Comparative Example 5 (total amount of dyes: 2.7 wt %): Inclusion of C. I. Direct Yellow 173 as the dye (2) makes it possible to obtain good result in the preservation stability evaluation. However, since the water-based ink of Comparative Example 5 does not comprise the dye (1), it was inferior in the result in the light resistance evaluation.

It will be obvious to those having skill in the art that many changes may be made in the above-described details of the particular aspects described herein without departing from the spirit or scope of the invention as defined in the appended claims.

What is claimed is:

1. A water-based ink for ink jet recording comprising a coloring agent, water, and a water-soluble organic solvent, wherein
the coloring agent comprises the following dye (1) and dye (2),
a weight ratio between the dye (1) and dye (2) is in the range of about 7:3 to about 9:1;
Dye (1): dye represented by the following general formula (1)
Dye (2): at least one dye selected from the group consisting of C. I. Direct Yellow 86, C. I. Direct Yellow 132, and C. I. Direct Yellow 142

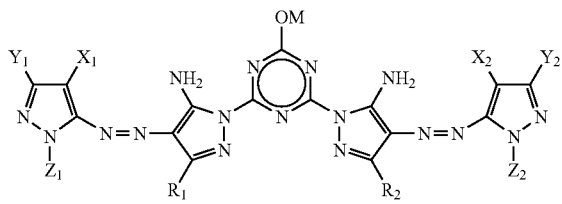

(1)

wherein in the general formula (1),
$R_1$, $R_2$, $Y_1$, and $Y_2$ each represents a monovalent group, provided that $R_1$, $R_2$, $Y_1$, and $Y_2$ may be the same or different;
$X_1$ and $X_2$, each independently, represents an electron attractive group, provided that $X_1$ and $X_2$ may be the same or different;
$Z_1$ and $Z_2$, each independently, represents a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, provided that $Z_1$ and $Z_2$ may be the same or different; and M represents a hydrogen atom, an ammonium ion, or a quaternary ammonium ion.

2. The water-based ink according to claim 1, wherein a total amount of the dye (1) and the dye (2) relative to a total amount of the ink is in the range of about 0.1 wt % to about 7 wt %.

3. The water-based ink according to claim 1, wherein the water-soluble organic solvent comprises polyalcohol.

4. The water-based ink according to claim 3, wherein the polyalcohol is glycerin.

5. The water-based ink according to claim 4, wherein an amount of the glycerin relative to a total amount of the ink is in the range of about 5 wt % to about 40 wt %.

6. The water-based ink according to claim 1, wherein the ink is a water-based yellow ink.

7. The water-based ink according to claim 1, wherein the dye (1) comprises at least one compound selected from the group consisting of compounds represented by the following chemical formulae (1-A) to (1-E):

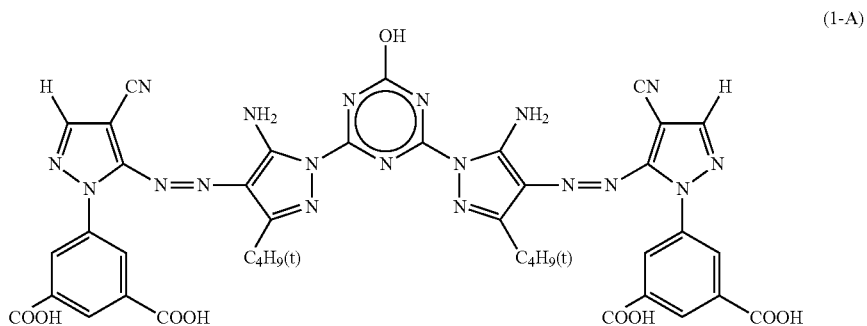

(1-A)

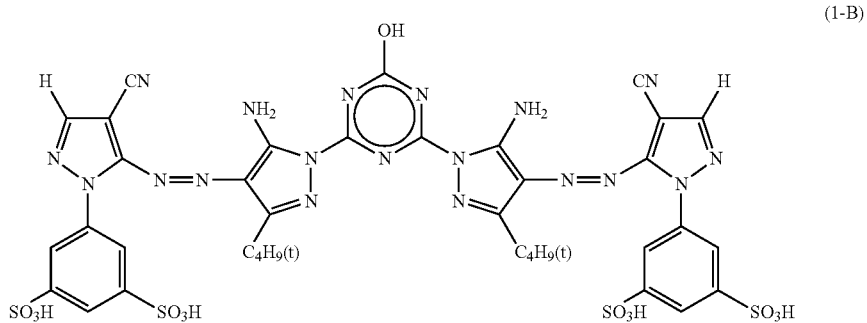

(1-B)

-continued

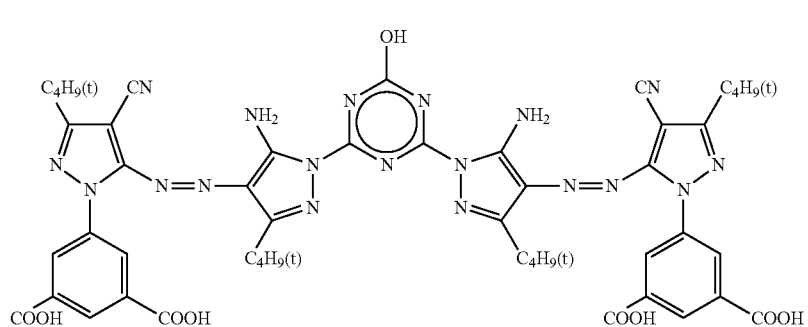

(1-C)

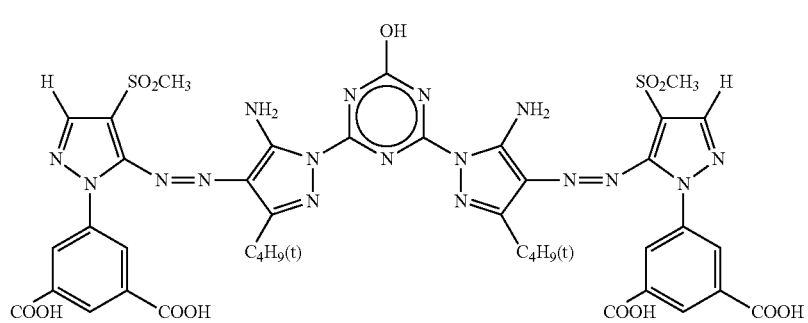

(1-D)

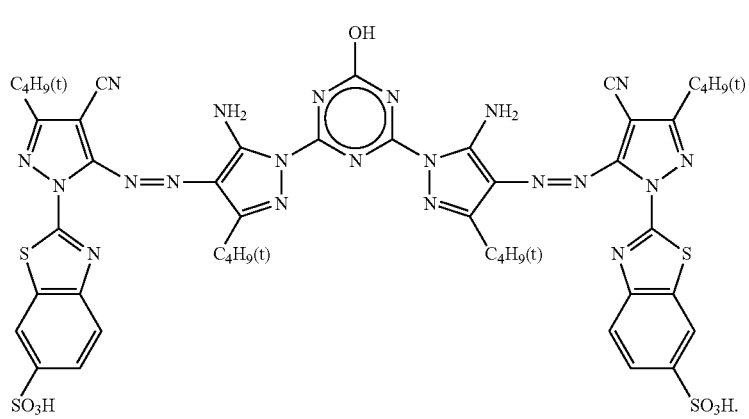

(1-E)

8. The water-based ink according to claim 1, wherein an amount of the dye (1) relative to a total amount of the ink is in the range of about 0.06 wt % to about 6.3 wt %.

9. The water-based ink according to claim 1, wherein an amount of the dye (2) relative to a total amount of the ink is in the range of about 0.01 wt % to about 2.8 wt %.

10. An ink cartridge comprising the water-based ink according to claim 1.

11. An ink jet recording apparatus comprising the ink cartridge according to claim 10 and an ink ejection unit, wherein the water-based ink comprised in the ink cartridge is ejected from the ink ejection unit.

12. A water-based ink for ink jet recording comprising a coloring agent, water, and a water-soluble organic solvent, wherein the coloring agent comprises the following dye (1) and dye (2), the weight ratio between the dye (1) and dye (2) is in the range of about 6:4 to about 9:1;

Dye (1): dye represented by the following general formula (I)

Dye (2): C.I. Direct Yellow 173

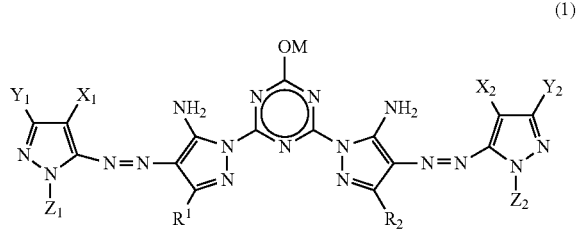

(1)

wherein in the general formula (1), $R_1$, $R_2$, $Y_1$, and $Y_2$ each represents a monovalent group, provided that $R_1$, $R_2$, $Y_1$, and $Y_2$ may be the same or different;

$X_1$ and $X_2$, each independently, represents an electron attractive group, provided that $X_1$ and $X_2$ may be the same or different;

$Z_1$ and $Z_2$, each independently, represents a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, provided that $Z_1$ and $Z_2$ may be the same or different; and M represents a hydrogen atom, an ammonium ion, or a quaternary ammonium ion.

13. The water-based ink according to claim 12, wherein a total amount of the dye (1) and the dye (2) relative to a total amount of the ink is in the range of about 0.1 wt % to about 7 wt %.

14. The water-based ink according to claim 12, wherein the water-soluble organic solvent comprises polyalcohol.

15. The water-based ink according to claim 14, wherein the polyalcohol is glycerin.

16. The water-based ink according to claim 15, wherein an amount of the glycerin relative to a total amount of the ink is in the range of about 5 wt % to about 40 wt %.

17. The water-based ink according to claim 12, wherein the ink is a water-based yellow ink.

18. The water-based ink according to claim 12, wherein the dye (1) comprises at least one compound selected from the group consisting of compounds represented by the following chemical formulae (1-A) to (1-E):

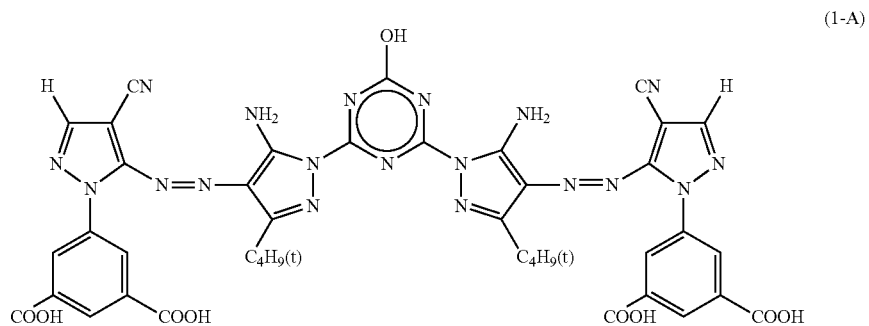

(1-A)

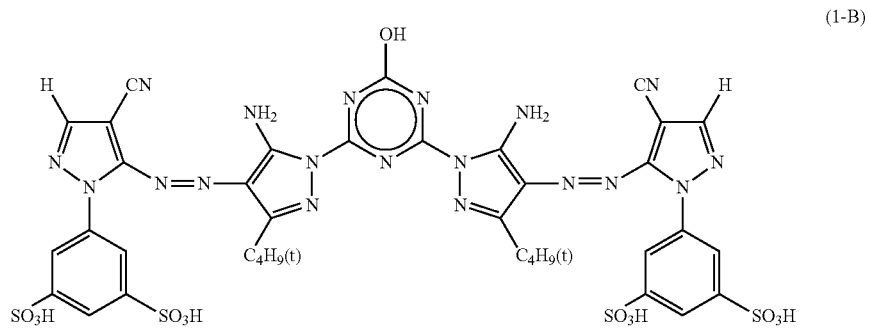

(1-B)

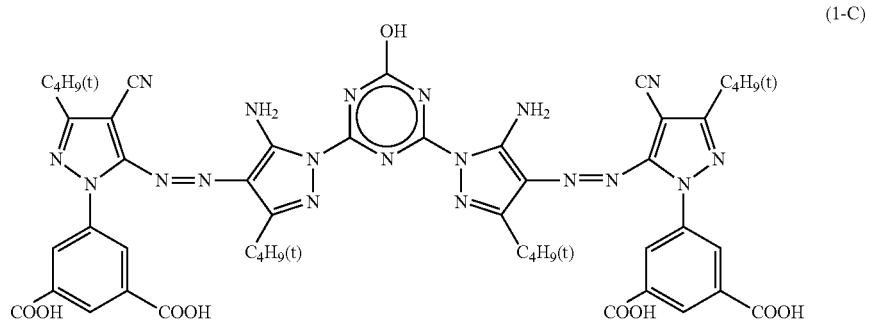

(1-C)

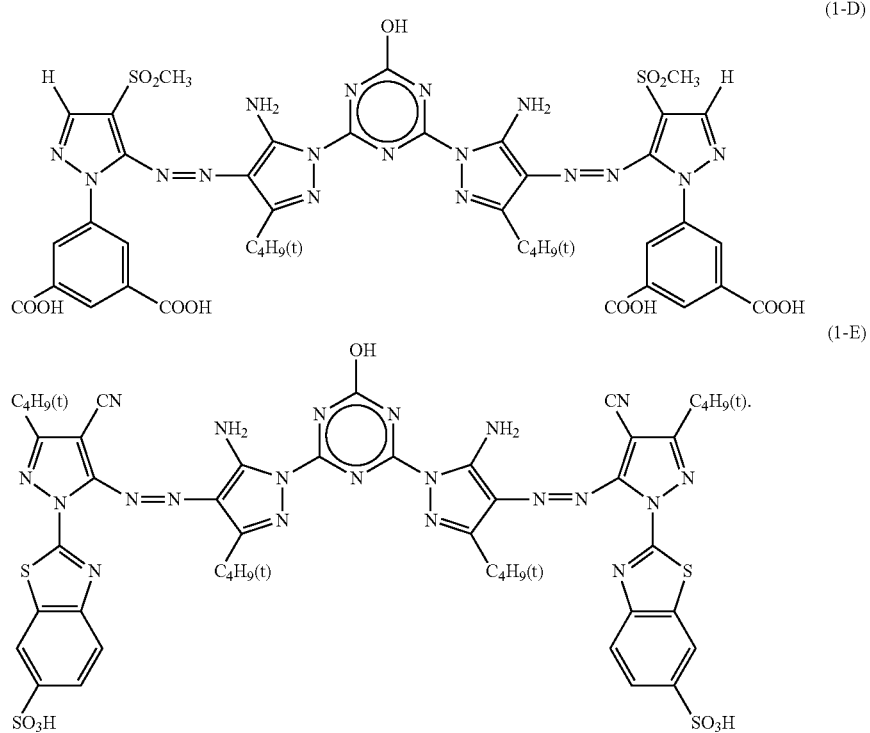

19. The water-based ink according to claim 12, wherein an amount of the dye (1) relative to a total amount of the ink is in the range of about 0.06 wt % to about 6.3 wt %.

20. The water-based ink according to claim 12, wherein an amount of the dye (2) relative to a total amount of the ink is in the range of about 0.01 wt % to about 2.8 wt %.

21. An ink cartridge comprising the water-based ink according to claim 12.

22. An ink jet recording apparatus comprising the ink cartridge according to claim 21 and an ink ejection unit, wherein the water-based ink comprised in the ink cartridge is ejected from the ink ejection unit.

* * * * *